United States Patent
Kaprinidis

(10) Patent No.: US 7,323,502 B2
(45) Date of Patent: Jan. 29, 2008

(54) FLAME RETARDANT COMPOSITIONS

(75) Inventor: Nikolas Kaprinidis, New York, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 400 days.

(21) Appl. No.: 10/375,327

(22) Filed: Feb. 27, 2003

(65) Prior Publication Data

US 2003/0220422 A1 Nov. 27, 2003

Related U.S. Application Data

(60) Provisional application No. 60/363,586, filed on Mar. 12, 2002.

(51) Int. Cl.
*C08K 5/34* (2006.01)
*C08K 5/3435* (2006.01)
*C08K 5/3445* (2006.01)

(52) U.S. Cl. .............. 524/95; 524/96; 524/97; 524/98; 524/99; 524/100; 524/102; 524/103; 524/116; 524/136; 524/144; 524/371; 524/401; 524/413; 524/415; 524/424; 524/464; 252/401; 252/403

(58) Field of Classification Search ............. 252/401, 252/403; 524/95–103, 116, 136, 144, 371, 524/401, 413, 415, 424, 464, 37
See application file for complete search history.

(56) References Cited

U.S. PATENT DOCUMENTS

| | | | | |
|---|---|---|---|---|
| 4,079,035 A | * | 3/1978 | Brackenridge | 525/437 |
| 4,451,400 A | * | 5/1984 | Wiezer | 540/542 |
| 5,004,770 A | * | 4/1991 | Cortolano et al. | 524/93 |
| 5,096,950 A | * | 3/1992 | Galbo et al. | 524/99 |
| 5,112,890 A | * | 5/1992 | Behrens et al. | 524/95 |
| 5,124,378 A | * | 6/1992 | Behrens et al. | 524/95 |
| 5,145,893 A | * | 9/1992 | Galbo et al. | 524/99 |
| 5,204,473 A | * | 4/1993 | Winter et al. | 546/188 |
| 5,216,156 A | * | 6/1993 | Galbo et al. | 544/198 |
| 5,300,544 A | * | 4/1994 | Galbo et al. | 524/100 |
| 5,393,812 A | * | 2/1995 | Haley et al. | 524/91 |
| 5,844,026 A | * | 12/1998 | Galbo et al. | 524/100 |
| 6,117,995 A | * | 9/2000 | Zedda et al. | 544/207 |
| 6,271,377 B1 | * | 8/2001 | Galbo et al. | 546/14 |
| 6,309,987 B1 | | 10/2001 | Srinivasan | 442/147 |
| 6,790,886 B2 | * | 9/2004 | Harashina et al. | 524/116 |
| 2003/0004240 A1 | | 1/2003 | Harashina et al. | 524/138 |

FOREIGN PATENT DOCUMENTS

| | | |
|---|---|---|
| EP | 0792911 | 9/1997 |
| EP | 1104766 | 6/2001 |
| WO | 99/00450 | 1/1999 |
| WO | 02/074847 | 9/2002 |
| WO | 03/016388 | 2/2003 |

OTHER PUBLICATIONS

R. Srinivasan, et al., "A Revolutionary UV Stable Flame Retardant System for Polyolefins", Int. Conf. Addit. Polyolefins, (1998), pp. 69-83, Feb. 1998.
R. Srinivasan, et al., "Advances in a Revolutionary Flame Retardant System for Polyolefins", Polyolefins 2000, INt. Conf. Polyolefins 2000, pp. 571-581, Feb. 2000.

* cited by examiner

*Primary Examiner*—Kriellion A Sanders
(74) *Attorney, Agent, or Firm*—Tyler A. Stevenson

(57) ABSTRACT

Organic polymeric substrates, for example polyolefins such as polypropylene, can be made flame retardant by the incorporation of a synergistic mixture of (i) at least one compound selected from the group consisting of the (a) sterically hindered nitroxyl stabilizers, (b) sterically hindered hydroxylamine stabilizers and (c) sterically hindered alkoxyamine stabilizers and (ii) at least one phosphazene flame retardant. Advantageously, a further flame retardant may be added, without the need of adding an antimony synergist. The compositions of the invention combine good flame retardant properties with light stability and good mechanical properties.

17 Claims, No Drawings

FLAME RETARDANT COMPOSITIONS

This application claims the benefit under 35 U.S.C. 119(e) of U.S. Provisional Application No. 60/363,586, Filed Mar. 12, 2002

The instant invention pertains to a novel method of flame retarding a polymeric substrate by adding thereto an effective flame retarding amount of a synergistic mixture of at least one sterically hindered nitroxyl, hydroxylamine or alkoxyamine, and at least one phosphazene flame retardant, and to a corresponding novel composition.

BACKGROUND OF THE INVENTION

U.S. Pat. No. 5,096,950 discloses the co-use of certain NOR (N-alkoxy) hindered amines with a brominated $Sb_2O_3$-containing flame retardant in polypropylene.

U.S. Pat. No. 5,393,812 discloses polyolefin compositions which are made flame retardant by a combination of a halogenated hydrocarbyl phosphate or phosphonate ester flame retardant in combination with a alkoxyamine functional hindered amine.

U.S. Pat. No. 5,844,026 discloses polyolefin compositions comprising certain NOR hindered amines and certain traditional flame retardants.

U.S. Pat. No. 6,117,995 discloses that certain N-alkoxy hindered amines may be used as flame retardants for organic polymers.

U.S. Pat. No. 6,271,377 discloses polyolefin compositions that comprise N-hydroxyalkoxy hindered amines and a halogenated flame retardant.

U.S. Pat. No. 6,309,987 and equivalent WO 99/54530 teach polyolefin non-woven flame retardant fabrics that comprise N-alkoxyamines.

A Revolutionary UV Stable Flame Retardant System for Polyolefins—R. Srinivasan, A. Gupta and D. Horsey, *Int. Conf. Addit. Polyolefins* 1998, 69-83, teaches polyolefins comprising certain NOR hindered amines with halogen and phosphorus containing traditional flame retardants.

Advances in a Revolutionary Flame Retardant System for Polyolefins—R. Srinivasan, B. Rotzinger, *Polyolefins* 2000, *Int Conf Polyolefins* 2000, 571-581, teaches polyolefins comprising certain NOR hindered amines with brominated and phosphorus containing flame retardants.

EP 0792911 A2, discloses polyolefin compositions that comprise alkoxyamine functional hindered amines and tris (trihalogenopentyl) phosphate flame retardants.

WO 99/00450, copending U.S. application Ser. Nos. 09/502,239, filed Nov. 3, 1999, and 09/714,717, filed Nov.16, 2000, disclose the use of certain N-alkoxy hindered amines as flame retardants.

EP 1104766 discloses cross-linked phenoxyphosphazene compounds as flame retardants for synthetic resins.

The flame retardant (FR) market today is comprised of products which function to interfere with the combustion process by chemical and/or physical means. Mechanistically these FRs have been proposed to function during combustion of an article in either the gas phase, the condensed phase or both. The organohalogens are proposed to generate halogen species (e.g. HX) which interferes in the gas phase with free radical organic "fuel" from the polymer substrate. Synergists are proposed to react with HX to form additional chemical species with interfere with combustion in the gas phase, such as reaction of antimony oxide with HX to form antimony halide and water vapor. Antimony compounds such as antimony trioxide also act as a radical scavenger forming antimony halides. Thus, it can inhibit the propagation of the fire.

Although antimony compounds are efficient in terms of cost performance, it recently raised a lot of concern because of the toxicity of the byproducts which are formed during combustion in the presence of a halogenated flame retardant. Antimony oxides often contain trace amounts of arsenic compounds which are suspected carcinogens. Because of these ecological concerns, there is a motion to replace antimony trioxide in the present commercial flame retardant applications. However, it is very difficult to find an effective synergist which is both enviromentally friendly and efficient as far as the cost performance is concerned.

Another reason to add flame retardant additives is to prevent dripping during the application of the fire. Dripping during combustion is the process of the separation of parts of the polymer from the matrix in the shape of droplets. Most often, the droplets are flaming and are imposing tremendous danger for fire spread. It is a common measure to add fillers such talc in large amounts to the polymer, with some negative consequences on the mechanical properties. Other fillers sometimes used include calcium carbonate, magnesium carbonate, zinc borate, silicates, silicones, glass fibres, glass bulbs, asbestos, kaolin, mica, barium sulfate, calcium sulfate, metal oxides, hydrates and hydroxides such as zinc oxide, magnesium hydroxide, alumina trihydrate, silica, calcium silicate, magnesium silicate.

It has been found that polymers with good flame retardant properties are prepared when a sterically hindered amine of the nitroxyl, hydroxylamine or alkoxyamine class is added thereto together with a phosphazene flame retardant. With this combination, antimony compounds and fillers may be largely reduced or replaced. As the instant nitroxyl, hydroxylamine and alkoxyamine compounds are active as stabilizers, the polymer compositions of the invention are efficiently protected from the deleterious effects of light, oxygen and/or heat.

DETAILED DISCLOSURE

The instant invention pertains to a flame retardant composition which comprises
(A) an organic polymer substrate and
(B) an effective flame retarding amount of a synergistic mixture of
  (i) at least one compound selected from the group consisting of the
    (a) sterically hindered nitroxyl stabilizers,
    (b) sterically hindered hydroxylamine stabilizers and
    (c) sterically hindered alkoxyamine stabilizers and
  (ii) at least one phosphazene flame retardant.

Advantageously, the compositions of the invention may further contain as component (iii) a conventional flame retardant, for example (iii) at least one compound selected from the group consisting of the halogenated flame retardants.

Components A, B(i), B(ii) and optional further components may comprise one or a mixture of more than one chemical species.

Advantageously, present composition contains only minor amounts of antimony compounds such as $Sb_2O_3$, e.g. less than about 1%, for instance less than about 0.1% by weight of the polymer component A; for example, the present compositions are essentially free of antimony.

Fillers are not required in order to improve the flame retardant properties and achieve a higher rating, e.g. in the UL-94 burning test (see below). Consequently, the present compositions of the invention contain only minor amounts of fillers, e.g. less than about 3%, for instance less than about 1%, for example less than about 0.1% by weight of the polymer component A; for example, the present compositions are essentially free of fillers.

It is noteworthy to mention that combinations of present components (i) and (ii), or components (ii) and (iii), or components (i) and (iii) alone do not result in a similar flame retardant efficacy. It is a requirement that the combination of the three additives of the invention as defined for component B above, for example at the specific levels given below, has to be used in order to achieve a high rating.

The polymeric substrate of component (A) is any of a wide variety of polymeric types including polyolefins, polystyrenics, and PVC. For example, the polymer substrate may be selected from the group of resins consisting of the polyolefins, the thermoplastic olefins, styrenic polymers and copolymers, ABS and polymers which contain hetero atoms, double bonds or aromatic rings. Specific embodiments are where component (A) is polypropylene, polyethylene, thermoplastic olefin (TPO), ABS or high impact polystyrene.

For example, the polymer substrate is selected from the group of resins consisting of the polyolefins, the thermoplastic olefins, styrenic polymers and copolymers, and ABS.

Another embodiment of the present invention is where the polymer substrate is selected from the group consisting of polypropylene, polyethylene, thermoplastic olefin (TPO), ABS and high impact polystyrene.

For instance, the polymer substrate is polypropylene, polyethylene or thermoplastic olefin (TPO). Organic polymers of component A are for example thermoplastic polymers such as polyolefins like polyethylene, polypropylene or copolymers thereof. The thermoplastic polymer is for example polypropylene.

Further examples for organic polymers (component A) are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE). Polyolefins, i.e. the polymers of monoolefins exemplified in the preceding paragraph, for example polyethylene and polypropylene, can be prepared by different, and especially by the following, methods:
   a) radical polymerisation (normally under high pressure and at elevated temperature).
   b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.
4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; for example atactic polymers. Stereoblock polymers are also included.

5. Polystyrene, poly(p-methylstyrene), poly(α-methylstyrene).
6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; for example atactic polymers. Stereoblock polymers are also included.
6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylenelstyrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; for example atactic polymers. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Sterically Hindered Stabilizers of Component (i)

The present sterically hindered stabilizers of component (i) are well known in the art, and are for example of the formula

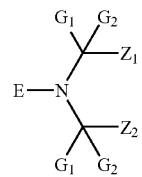

where $G_1$ and $G_2$ are independently alkyl of 1 to 8 carbon atoms or are together pentamethylene, $Z_1$ and $Z_2$ are each methyl, or $Z_1$ and $Z_2$ together form a linking moiety which may additionally be substituted by an ester, ether, amide, amino, carboxy or urethane group, and E is oxyl, hydroxyl, alkoxy, cycloalkoxy, aralkoxy, aryloxy, —O—CO—$OZ_3$, —O—Si$(Z_4)_3$, —O—PO$(OZ_5)_2$ or —O—$CH_2$—$OZ_6$ where $Z_3$, Z4, $Z_5$ and Z6 are selected from the group consisting of hydrogen, an aliphatic, araliphatic and aromatic moiety; or E is —O-T-(OH)$_b$, T is a straight or branched chain alkylene of 1 to 18 carbon atoms, cycloalkylene of 5 to 18 carbon atoms, cycloalkenylene of 5 to 18 carbon atoms, a straight or branched chain alkylene of 1 to 4 carbon atoms substituted by phenyl or by phenyl substituted by one or two alkyl groups of 1 to 4 carbon atoms;

b is 1, 2 or 3 with the proviso that b cannot exceed the number of carbon atoms in T, and when b is 2 or 3, each hydroxyl group is attached to a different carbon atoms of T.

E is for example oxyl, hydroxyl, alkoxy, cycloalkoxy or aralkoxy. For instance, E is methoxy, propoxy, cyclohexyloxy or octyloxy.

The present sterically hindered stabilizers of component (i) are for example of the formula A-R -continued

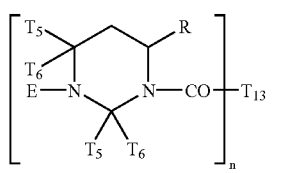 (L)

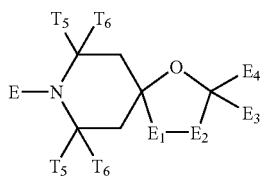 (M)

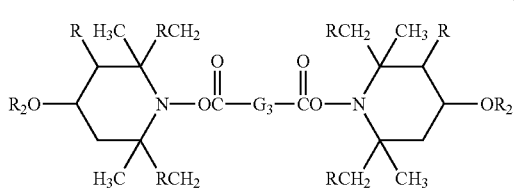 (N)

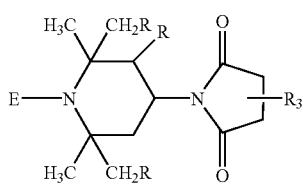 (O)

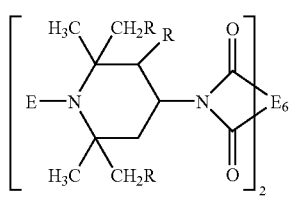 (P)

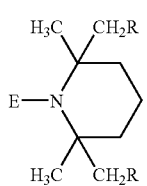 (Q)

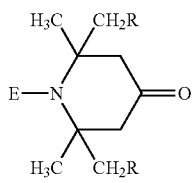 (R)

wherein

E is oxyl, hydroxyl, alkoxy of 1 to 18 carbon atoms, cycloalkoxy of 5 to 12 carbon atoms or aralkoxy of 7 to 15 carbon atoms, or E is —O-T-(OH)$_b$, T is a straight or branched chain alkylene of 1 to 18 carbon atoms, cycloalkylene of 5 to 18 carbon atoms, cycloalkenylene of 5 to 18 carbon atoms, a straight or branched chain alkylene of 1 to 4 carbon atoms substituted by phenyl or by phenyl substituted by one or two alkyl groups of 1 to 4 carbon atoms;

b is 1, 2 or 3 with the proviso that b cannot exceed the number of carbon atoms in T, and when b is 2 or 3, each hydroxyl group is attached to a different carbon atoms of T;

R is hydrogen or methyl, m is 1 to 4, when m is 1, $R_2$ is hydrogen, $C_1$-$C_{18}$alkyl or said alkyl optionally interrupted by one or more oxygen atoms, $C_2$-$C_{12}$alkenyl, $C_6$-$C_{10}$aryl, $C_7$-$C_{18}$aralkyl, glycidyl, a monovalent acyl radical of an aliphatic, cycloaliphatic or aromatic carboxylic acid, or a carbamic acid, for example an acyl radical of an aliphatic carboxylic acid having 2-18 C atoms, of a cycloaliphatic carboxylic acid having 5-12 C atoms or of an aromatic carboxylic acid having 7-15 C atoms, or

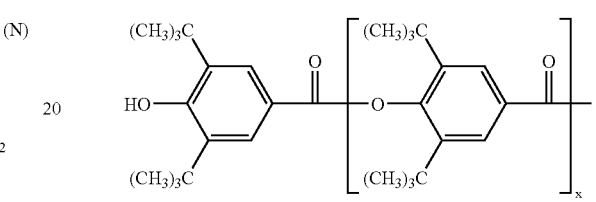

wherein x is 0 or 1,

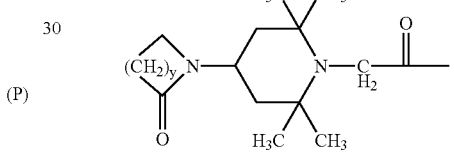

wherein y is 2-4;

when m is 2, $R_2$ is $C_1$-$C_{12}$alkylene, $C_4$-$C_{12}$alkenylene, xylylene, a divalent acyl radical of an aliphatic, cycloaliphatic, araliphatic or aromatic dicarboxylic acid or of a dicarbamic acid, for example an acyl radical of an aliphatic dicarboxylic acid having 2-18 C atoms, of a cycloaliphatic or aromatic dicarboxylic acid having 8-14 C atoms, or of an aliphatic, cycloaliphatic or aromatic dicarbamic acid having 8-14 C atoms;

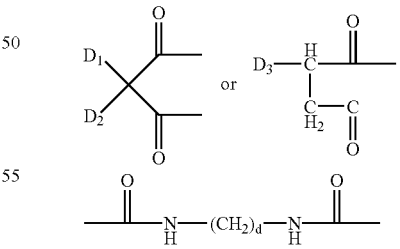

wherein $D_1$ and $D_2$ are independently hydrogen, an alkyl radical containing up to 8 carbon atoms, an aryl or aralkyl radical including 3,5-di-t-butyl-4-hydroxybenzyl radical, $D_3$ is hydrogen, or an alkyl or alkenyl radical containing up to 18 carbon atoms, and d is 0-20;

when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid including 1,2,3,4-butanetetracarboxylic acid, 1,2,3,4-but-2-ene-tetracarboxylic, and 1,2,3,5- and 1,2,4,5-pentanetetracarboxylic acid;

p is 1, 2 or 3, $R_3$ is hydrogen, $C_1$-$C_{12}$alkyl, $C_5$-$C_7$cycloalkyl, $C_7$-$C_9$aralkyl, $C_2$-$C_{18}$alkanoyl, $C_3$-$C_5$alkenoyl or benzoyl;

when p is 1, $R_4$ is hydrogen, $C_1$-$C_{18}$alkyl, $C_5$-$C_7$cycloalkyl, $C_2$-$C_8$alkenyl, unsubstituted or substituted by a cyano, carbonyl or carbamide group, aryl, aralkyl, or it is glycidyl, a group of the formula —$CH_2$—CH(OH)-Z or of the formula —CO-Z or —CONH-Z wherein Z is hydrogen, methyl or phenyl; or a group of the formulae

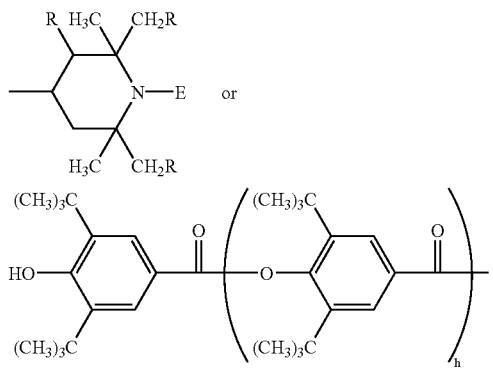

where h is 0 or 1, $R_3$ and $R_4$ together, when p is 1, can be alkylene of 4 to 6 carbon atoms or 2-oxo-polyalkylene the cyclic acyl radical of an aliphatic or aromatic 1,2- or 1,3-dicarboxylic acid, when p is 2, $R_4$ is a direct bond or is $C_1$-$C_{12}$alkylene, $C_6$-$C_{12}$arylene, xylylene, a —$CH_2CH(OH)$—$CH_2$ group or a group —$CH_2$—CH(OH)—$CH_2$—O—X—O—$CH_2$—CH(OH)—$CH_2$— wherein X is $C_2$-$C_{10}$alkylene, $C_6$-$C_{15}$arylene or $C_6$-$C_{12}$cycloalkylene; or, provided that $R_3$ is not alkanoyl, alkenoyl or benzoyl, $R_4$ can also be a divalent acyl radical of an aliphatic, cycloaliphatic or aromatic dicarboxylic acid or dicarbamic acid, or can be the group —CO—; or $R_4$ is

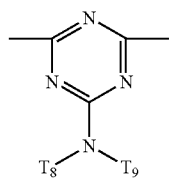

where $T_8$ and $T_9$ are independently hydrogen, alkyl of 1 to 18 carbon atoms, or $T_8$ and $T_9$ together are alkylene of 4 to 6 carbon atoms or 3-oxapentamethylene, for instance $T_8$ and $T_9$ together are 3-oxapentamethylene;

when p is 3, $R_4$ is 2,4,6-triazinyl, n is 1 or 2, when n is 1, $R_5$ and $R'_5$ are independently $C_1$-$C_{12}$ alkyl, $C_2$-$C_{12}$ alkenyl, $C_7$-$C_{12}$ aralkyl, or $R_5$ is also hydrogen, or $R_5$ and $R'_5$ together are $C_2$-$C_8$alkylene or hydroxyalkylene or $C_4$-$C_{22}$acyloxyalkylene;

when n is 2, $R_5$ and $R'_5$ together are (—$CH_2$)$_2$C($CH_2$—)$_2$;

$R_6$ is hydrogen, $C_1$-$C_{12}$alkyl, allyl, benzyl, glycidyl or $C_2$-$C_6$alkoxyalkyl;

when n is 1, $R_7$ is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl, a group of the formula —($CH_2$)$_t$—COO-Q or of the formula —($CH_2$)$_t$—O—CO-Q wherein t is 1 or 2, and Q is $C_1$-$C_4$alkyl or phenyl; or when n is 2, $R_7$ is $C_2$-$C_{12}$alkylene, $C_6$-$C_{12}$arylene, a group —$CH_2$CH(OH)—$CH_2$—O—X—O—$CH_2$—CH(OH)—$CH_2$— wherein X is $C_2$-$C_{10}$alkylene, $C_6$-$C_{15}$arylene or $C_6$-$C_{12}$cycloalkylene, or a group —$CH_2$CH(OZ')$CH_2$—(OCH$_2$—CH(OZ')$CH_2$)$_2$— wherein Z' is hydrogen, $C_1$-$C_{18}$alkyl, allyl, benzyl, $C_2$-$C_{12}$alkanoyl or benzoyl;

$Q_1$ is —N($R_8$)— or —O—; $E_7$ is $C_1$-$C_3$ alkylene, the group —$CH_2$—CH($R_9$)—O— wherein $R_9$ is hydrogen, methyl or phenyl, the group —($CH_2$)$_3$—NH— or a direct bond;

$R_{10}$ is hydrogen or $C_1$-$C_{18}$ alkyl, $R_8$ is hydrogen, $C_1$-$C_{18}$alkyl, $C_5$-$C_7$cycloalkyl, $C_7$-$C_{12}$aralkyl, cyanoethyl, $C_6$-$C_{10}$aryl, the group —$CH_2$—CH($R_9$)—OH wherein $R_9$ has the meaning defined above; a group of the formula

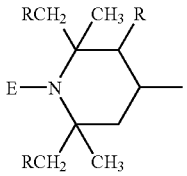

or a group of the formula

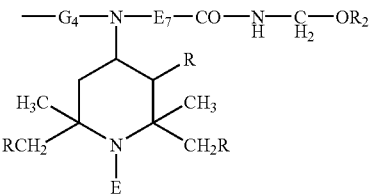

wherein $G_4$ is $C_2$-$C_6$alkylene or $C_6$-$C_{12}$arylene; or $R_8$ is a group -$E_7$-CO—NH—$CH_2OR_{10}$;

Formula F denotes a recurring structural unit of a polymer where $T_3$ is ethylene or 1,2-propylene, is the repeating structural unit derived from an alpha-olefin copolymer with an alkyl acrylate or methacrylate; for example a copolymer of ethylene and ethyl acrylate, and where k is 2 to 100;

$T_4$ has the same meaning as $R_4$ when p is 1 or 2, $T_5$ is methyl, $T_6$ is methyl or ethyl, or $T_5$ and $T_6$ together are tetramethylene or pentamethylene, for instance $T_5$ and $T_6$ are each methyl, M and Y are independently methylene or carbonyl, and $T_4$ is ethylene where n is 2;

$T_7$ is the same as $R_7$, and $T_7$ is for example octamethylene where n is 2, $T_{10}$ and $T_{11}$ are independently alkylene of 2 to 12 carbon atoms, or $T_{11}$ is

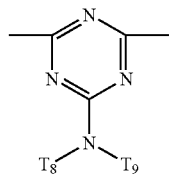

$T_{12}$ is piperazinyl,

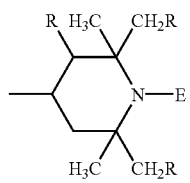

where $R_{11}$ is the same as $R_3$ or is also

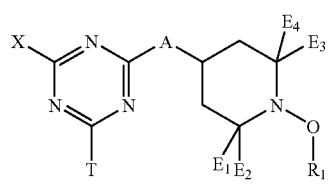

a, b and c are independently 2 or 3, and f is 0 or 1, for instance a and c are each 3, b is 2 and f is 1; and e is 2, 3 or 4, for example 4;

$T_{13}$ is the same as $R_2$ with the proviso that $T_{13}$ cannot be hydrogen when n is 1;

$E_1$ and $E_2$, being different, each are —CO— or —N($E_5$)- where $E_5$ is hydrogen, $C_1$-$C_{12}$ alkyl or $C_4$-$C_{22}$ alkoxycarbonylalkyl, for instance $E_1$ is —CO— and $E_2$ is —N($E_5$)-, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by up to four alkyl groups of 1 to 4 carbon atoms, for example methyl, $E_6$ is an aliphatic or aromatic tetravalent radical, $R_2$ of formula (N) is a previously defined when m is 1;

$G_1$ a direct bond, $C_1$-$C_{12}$ alkylene, phenylene or —NH-G'-NH wherein G' is $C_1$-$C_{12}$ alkylene; or wherein the hindered amine compound is a compound of the formula I, II, III, IV, V, VI, VII, VIII, IX, X or XI (I)

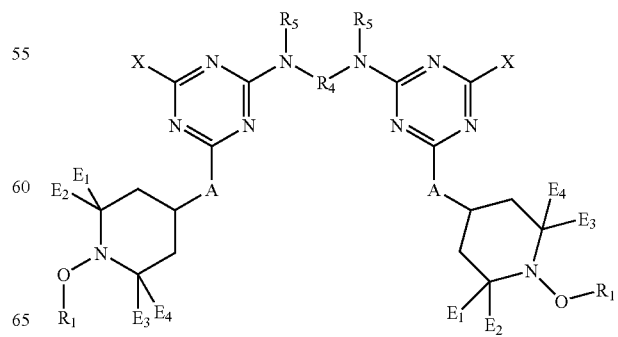

(II)

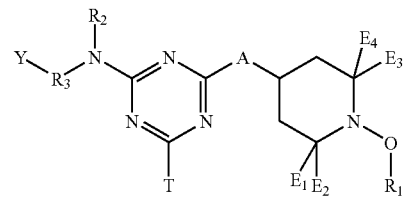

(III)

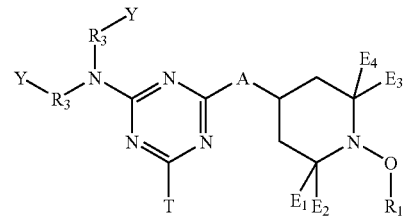

(IV)

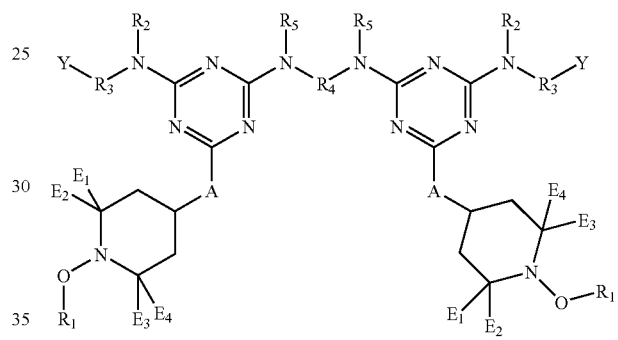

(V)

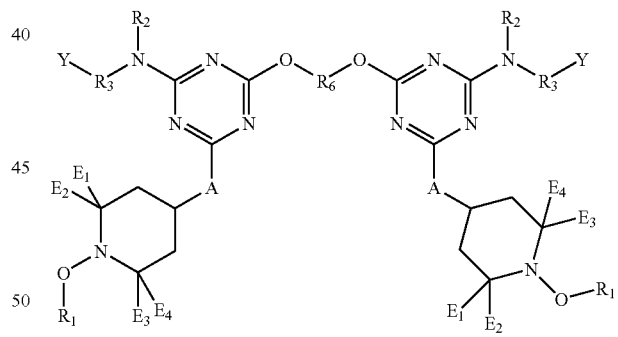

(VI)

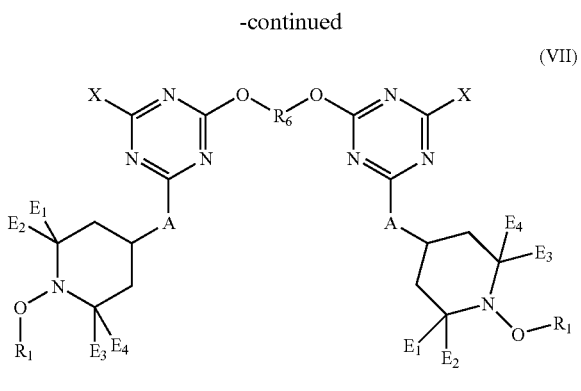
(VII)

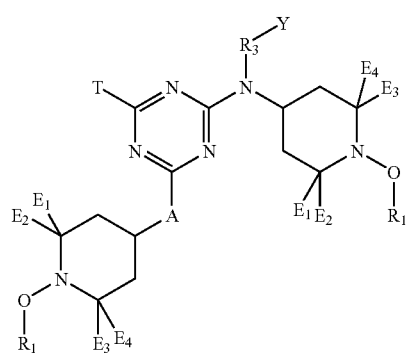
(VIII)

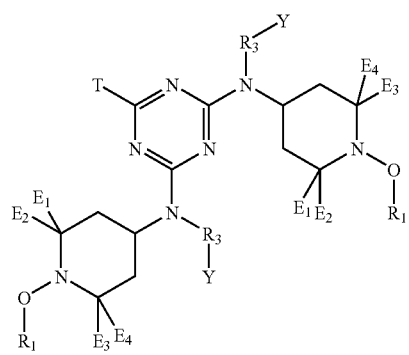
(IX)

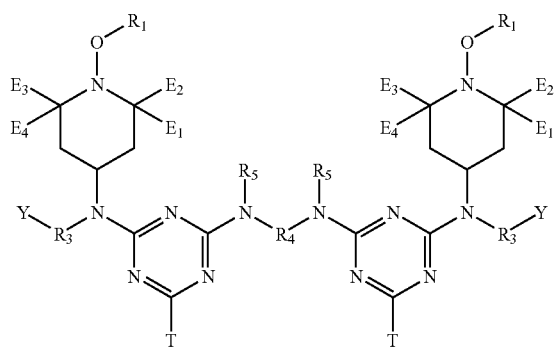
(X)

(XI)

wherein $E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene, $R_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 15 carbon atoms, aryl of 6 to 10 carbon atoms or said aryl substituted by one to three alkyl of 1 to 8 carbon atoms, $R_2$ is hydrogen or a linear or branched chain alkyl of 1 to 12 carbon atoms, $R_3$ is alkylene of 1 to 8 carbon atoms, or $R_3$ is —CO—, —CO—$R_4$—, —CONR$_2$—, or —CO—NR$_2$—$R_4$—, $R_4$ is alkylene of 1 to 8 carbon atoms, $R_5$ is hydrogen, a linear or branched chain alkyl of 1 to 12 carbon atoms, or

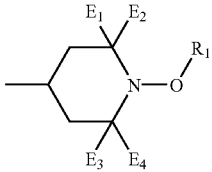

or when $R_4$ is ethylene, two $R_5$ methyl substituents can be linked by a direct bond so that the triazine bridging group —N($R_5$)—$R_4$—N($R_5$)— is a piperazin-1,4-diyl moiety, $R_6$ is alkylene of 2 to 8 carbon atoms or $R_6$ is

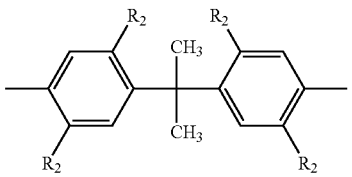

with the proviso that Y is not —OH when $R_6$ is the structure depicted above,

A is —O— or —NR$_7$— where $R_7$ is hydrogen, a straight or branched chain alkyl of 1 to 12 carbon atoms, or $R_7$ is

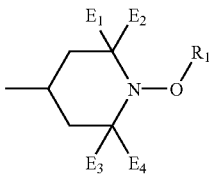

T is phenoxy, phenoxy substituted by one or two alkyl groups of 1 to 4 carbon atoms, alkoxy of 1 to 8 carbon atoms or —N(R$_2$)$_2$ with the stipulation that R$_2$ is not hydrogen, or T is

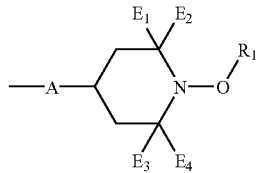

X is —NH$_2$, —NCO, —OH, —O-glycidyl, or —NHNH$_2$, and

Y is —OH, —NH$_2$, —NHR$_2$ where R$_2$ is not hydrogen; or Y is —NCO, —COOH, oxiranyl, —O-glycidyl, or —Si(OR$_2$)$_3$; or the combination R$_3$—Y— is —CH$_2$CH(OH)R$_2$ where R$_2$ is alkyl or said alkyl interrupted by one to four oxygen atoms, or R$_3$—Y— is —CH$_2$OR$_2$;

or wherein the hindered amine compound is a mixture of N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine; N,N',N''-tris{2,4-bis[(1-hydrocarbyloxy-2,2,6,6-tetramethylpiperidin4-yl)alkylamino]-s-triazin-6-yl}-3,3'-ethylenediiminodipropylamine, and bridged derivatives as described by formulas I, II, IIA and III

R$_1$NH—CH$_2$CH$_2$CH$_2$NR$_2$CH$_2$CH$_2$NR$_3$CH$_2$CH$_2$CH$_2$NHR$_4$ (I)

T-E$_1$-T$_1$ (II)

T-E$_1$ (IIA)

G-E$_1$-G$_1$-E$_1$-G$_2$ (III)

where in the tetraamine of formula I

R$_1$ and R$_2$ are the s-triazine moiety E; and one of R$_3$ and R$_4$ is the s-triazine moiety E with the other of R$_3$ or R$_4$ being hydrogen, E is

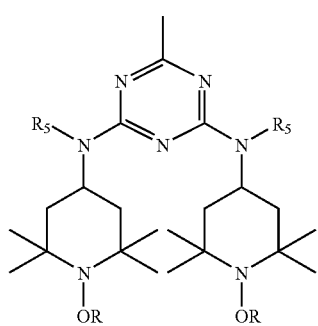

R is methyl, propyl, cyclohexyl or octyl, for instance cyclohexyl,

R$_5$ is alkyl of 1 to 12 carbon atoms, for example n-butyl, where in the compound of formula II or IIA when R is propyl, cyclohexyl or octyl, T and T$_1$ are each a tetraamine substituted by R$_1$-R$_4$ as is defined for formula I, where (1) one of the s-triazine moieties E in each tetraamine is replaced by the group E$_1$ which forms a bridge between two tetraamines T and T$_1$, E$_1$ is

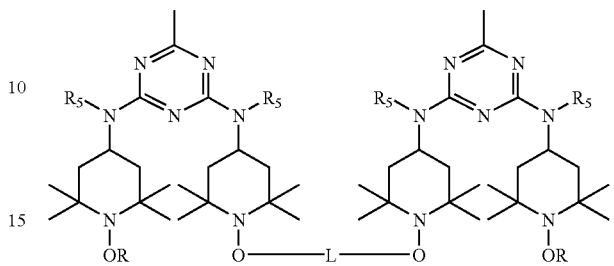

or (2) the group E$_1$ can have both termini in the same tetraamine T as in formula IIA where two of the E moieties of the tetraamine are replaced by one E$_1$ group, or (3) all three s-triazine substituents of tetraamine T can be E$_1$ such that one E$_1$ links T and T$_1$ and a second E$_1$ has both termini in tetraamine T, L is propanediyl, cyclohexanediyl or octanediyl;

where in the compound of formula III

G, G$_1$ and G$_2$ are each tetraamines substituted by R$_1$-R$_4$ as defined for formula I, except that G and G$_2$ each have one of the s-triazine moieties E replaced by E$_1$, and G$_1$ has two of the triazine moieties E replaced by E$_1$, so that there is a bridge between G and G$_1$ and a second bridge between G$_1$ and G$_2$;

which mixture is prepared by reacting two to four equivalents of 2,4-bis[(1-hydrocarbyl-oxy-2,2,6,6-piperidin-4-yl)butylamino]-6-chloro-s-triazine with one equivalent of N,N'-bis(3-aminopropyl)ethylenediamine;

or the hindered amine is a compound of the formula IIIb

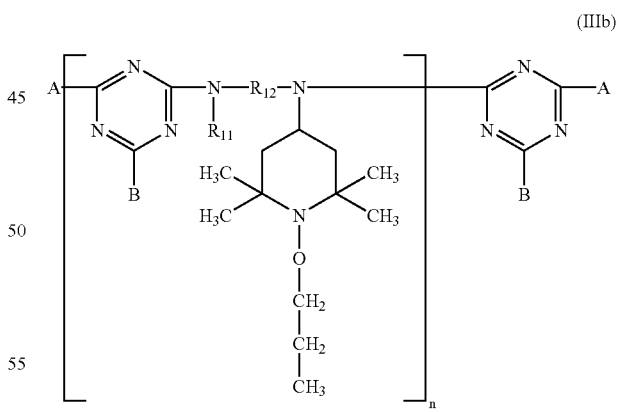

in which the index n ranges from 1 to 15;

R$_{12}$ is C$_2$-C$_{12}$alkylene, C$_4$-C$_{12}$alkenylene, C$_5$-C$_7$cycloalkylene, C$_5$-C$_7$cycloalkylene-di(C$_1$-C$_4$alkylene), C$_1$-C$_4$alkylenedi(C$_5$-C$_7$cycloalkylene), phenylenedi(C$_1$-C$_4$alkylene) or C$_4$-C$_{12}$alkylene interrupted by 1,4-piperazinediyl, —O— or >N—X$_1$ with X$_1$ being C$_1$-C$_{12}$acyl or (C$_1$-C$_{12}$alkoxy)carbonyl or having one of the definitions of R$_{14}$ given below except hydrogen; or R$_{12}$ is a group of the formula (Ib') or (Ic');

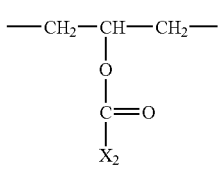
(Ib')

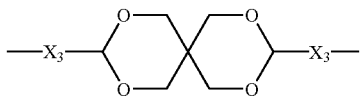
(Ic')

with m being 2 or 3,

X₂ being $C_1$-$C_{18}$alkyl, $C_5$-$C_{12}$cycloalkyl which is unsubstituted or substituted by 1, 2 or 3 $C_1$-$C_4$alkyl; phenyl which is unsubstituted or substituted by 1, 2 or 3 $C_1$-$C_4$alkyl or $C_1$-$C_4$alkoxy; $C_7$-$C_9$phenylalkyl which is unsubstituted or substituted on the phenyl by 1, 2 or 3 $C_1$-$C_4$alkyl; and the radicals X₃ being independently of one another $C_2$-$C_{12}$alkylene;

$R_{13}$, $R_{14}$ and $R_{15}$, which are identical or different, are hydrogen, $C_1$-$C_{18}$alkyl, $C_5$-$C_{12}$cycloalkyl which is unsubstituted or substituted by 1, 2 or 3 $C_1$-$C_4$alkyl; $C_3$-$C_{18}$alkenyl, phenyl which is unsubstituted or substituted by 1, 2 or 3 $C_1$-$C_4$alkyl or $C_1$-$C_4$alkoxy; $C_7$-$C_9$phenylalkyl which is unsubstituted or substituted on the phenyl by 1, 2 or 3 $C_1$-$C_4$alkyl; tetrahydrofurfuryl or $C_2$-$C_4$alkyl which is substituted in the 2, 3 or 4 position by —OH, $C_1$-$C_8$alkoxy, di($C_1$-$C_4$alkyl)amino or a group of the formula (Ie');

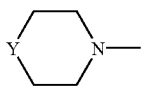
(Ie')

with Y being —O—, —CH₂—, —CH₂CH₂— or >N—CH₃, or —N($R_{14}$)($R_{15}$) is additionally a group of the formula (Ie');

the radicals A are independently of one another —O$R_{13}$, —N($R_{14}$)($R_{15}$) or a group of the formula (IIId);

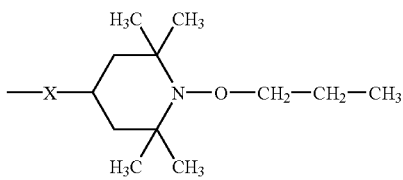
(IIId)

X is —O— or >N—$R_{16}$;

$R_{16}$ is hydrogen, $C_1$-$C_{18}$alkyl, $C_3$-$C_{18}$alkenyl, $C_5$-$C_{12}$cycloalkyl which is unsubstituted or substituted by 1, 2 or 3 $C_1$-$C_4$alkyl; $C_7$-$C_9$phenylalkyl which is unsubstituted or substituted on the phenyl by 1, 2 or 3 $C_1$-$C_4$alkyl; tetrahydrofurfuryl, a group of the formula (IIIf),

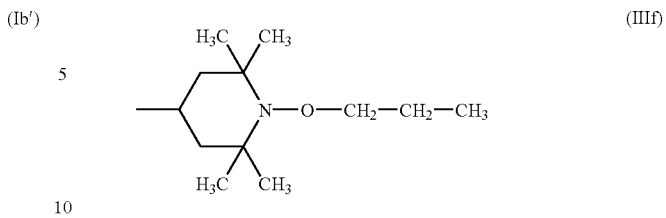
(IIIf)

or $C_2$-$C_4$alkyl which is substituted in the 2, 3 or 4 position by —OH, $C_1$-$C_8$alkoxy, di($C_1$-$C_4$alkyl)amino or a group of the formula (Ie');

$R_{11}$ has one of the definitions given for $R_{16}$; and the radicals B have independently of one another one of the definitions given for A.

Alkyl is straight or branched and is for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

Cycloalkyl groups include cyclopentyl and cyclohexyl; typical cycloalkenyl groups include cyclohexenyl; while typical aralkyl groups include benzyl, alpha-methyl-benzyl, alpha,alpha-dimethylbenzyl or phenethyl.

If R₂ is a monovalent acyl radical of a carboxylic acid, it is for example an acyl radical of acetic acid, stearic acid, salicyclic acid, benzoic acid or β-(3,5-di-tert-butyl-4-hydroxyphenyl)propionic acid.

If R₂ is a divalent acyl radical of a dicarboxylic acid, it is for example an acyl radical of oxalic acid, adipic acid, succinic acid, suberic acid, sebacic acid, phthalic acid dibutylmalonic acid, dibenzylmalonic acid or butyl-(3,5-di-tert-butyl-4-hydroxybenzyl)-malonic acid, or bicycloheptenedicarboxylic acid, with succinates, sebacates, phthalates and isophthalates being specific examples.

If R₂ is a divalent acyl radical of a dicarbamic acid, it is for example an acyl radical of hexamethylenedicarbamic acid or of 2,4-toluylenedicarbamic acid.

The hindered alkoxyamine stabilizers of component (c) are well known in the art, also known as N-alkoxy hindered amines and NOR hindered amines or NOR hindered amine light stabilizers or NOR HALS.

They are disclosed for example in U.S. Pat. Nos. 5,004,770, 5,204,473, 5,096,950, 5,300,544, 5,112,890, 5,124,378, 5,145,893, 5,216,156, 5,844,026, 6,117,995, 6,271,377, and U.S. application Ser. No. 09/505,529, filed Feb. 17, 2000, U.S. Ser. No. 09/794,710, filed Feb. 27, 2001, U.S. Ser. No. 09/714,717, filed Nov. 16, 2000, U.S. Ser. No. 09/502,239, filed Nov. 3, 1999 and U.S. Ser. No. 60/312,517, filed Aug. 15, 2001. The relevant disclosures of these patents and applications are hereby incorporated by reference.

U.S. Pat. No. 6,271,377, and U.S. application Ser. No. 09/505,529, filed Feb. 17, 2000, and U.S. Ser. No. 09/794,710, filed Feb. 27, 2001, cited above disclose hindered hydroxyalkoxyamine stabilizers. For the purposes of this invention, the hindered hydoxyalkoxyamine stabilizers are considered a subset of the hindered alkoxyamine stabilizers and are part of present component (c). Hindered hydroxyalkoxyamine stabilizers are also known as N-hydroxyalkoxy hindered amines, or NORol HALS.

Typical nitroxyls of component (a) include bis(1-oxyl-2,2,6,6-tetramethylpiperidin-4-yl) sebacate, 4-hydroxy-1-oxyl-2,2,6,6-tetramethylpiperidine, 4-ethoxy-1-oxyl-2,2,6,6-tetramethylpiperidine, 4-propoxy-1-oxyl-2,2,6,6-tetramethylpiperidine, 4-acetamido-1-oxyl-2,2,6,6- tetramethylpiperidine, 1-oxyl-2,2,6,6-tetramethylpiperidine, 1-oxyl-2,2,6,6-tetramethylpiperidin-4-one, 1-oxyl-2,2,6,6-tetramethylpiperidin-4-yl acetate, 1-oxyl-2,2,6,6-tetramethylpiperidin-4-yl 2-ethylhexanoate, 1-oxyl-2,2,6,6-tetramethylpiperidin-4-yl stearate, 1-oxyl-2,2,6,6-tetramethylpiperidin-4-yl benzoate, 1-oxyl-2,2,6,6-tetramethylpiperidin4-yl 4-t-butyl-benzoate, bis(1-oxyl-2,2,6,6-tetramethylpiperidin-4-yl) succinate, bis(1-oxyl-2,2,6,6-tetramethylpiperidin-4-yl) adipate, bis(1-oxyl-2,2,6,6-tetramethylpiperidin-4-yl) n-butylmalonate, bis(1-oxyl-2,2,6,6-tetramethylpiperidin-4-yl) phthalate, bis(1-oxyl-2,2,6,6-tetramethylpiperidin-4-yl) isophthalate, bis(1-oxyl-2,2,6,6-tetramethylpiperidin-4-yl) terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris-[N-butyl-N-(1-oxyl-2,2,6,6-tetramethylpiperidin-4-yl)]-s-triazine, 4,4'-ethylenebis(1-oxyl-2,2,6,6-tetramethylpiperazin-3-one), 2-oxyl-1,1,3,3-tetramethyl-2-isobenzazole, 1-oxyl-2,2,5,5-tetramethylpyrrolidine, and N,N-bis-(1,1,3,3-tetramethylbutyl)nitroxide.

Nitroxyl stabilizers of component (a) are for example bis(1-oxyl-2,2,6,6-tetramethylpiperidin-4-yl) sebacate, 4-hydroxy-1-oxyl-2,2,6,6-tetramethylpiperidine, 4-ethoxy-1-oxyl-2,2,6,6-tetramethylpiperidine, 4-propoxy-1-oxyl-2,2,6,6-tetramethylpiperidine, 4-acetamido-1-oxyl-2,2,6,6-tetramethylpiperidine, 1-oxyl-2,2,6,6-tetramethylpiperidine, and 1-oxyl-2,2,6,6-tetramethylpiperidin-4-one.

A specific embodiment is where the nitroxyl stabilizers of component (a) are bis(1-oxyl-2,2,6,6-tetramethylpiperidin-4-yl) sebacate and 4-hydroxy-1-oxyl-2,2,6,6-tetramethylpiperidine.

Specific examples of suitable compounds of present component (i) include:
(a) the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6];
(b) 1-cyclohexyloxy-2,2,6,6-tetramethyl-4-octadecylaminopiperidine;
(c) bis(1-octyloxy-2,2,6,6-tetramethylpiperidin-4-yl) sebacate;
(d) 2,4-bis[(1-cyclohexyloxy-2,2,6,6-tetramethylpiperidin-4-yl)butylamino]-6-(2-hydroxyethylamino-s-triazine;
(e) bis(1-cyclohexyloxy-2,2,6,6-tetramethylpiperidin-4-yl) adipate;
(h) 2,4-bis[(1-cyclohexyloxy-2,2,6,6-piperidin-4-yl)butylamino]-6-chloro-s-triazine;
(i) 1-(2-hydroxy-2-methylpropoxy)-4-hydroxy-2,2,6,6-tetramethylpiperidine;
(j) 1-(2-hydroxy-2-methylpropoxy)-4-oxo-2,2,6,6-tetramethylpiperidine;
(k) 1-(2-hydroxy-2-methylpropoxy)-4-octadecanoyloxy-2,2,6,6-tetramethylpiperidine;
(l) bis(1-(2-hydroxy-2-methylpropoxy)-2,2,6,6-tetramethylpiperidin-4-yl) sebacate;
(m) bis(1-(2-hydroxy-2-methylpropoxy)-2,2,6,6-tetramethylpiperidin4-yl) adipate;
(n) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine; and in which n is from 1 to 15.

(o) the compound of formula

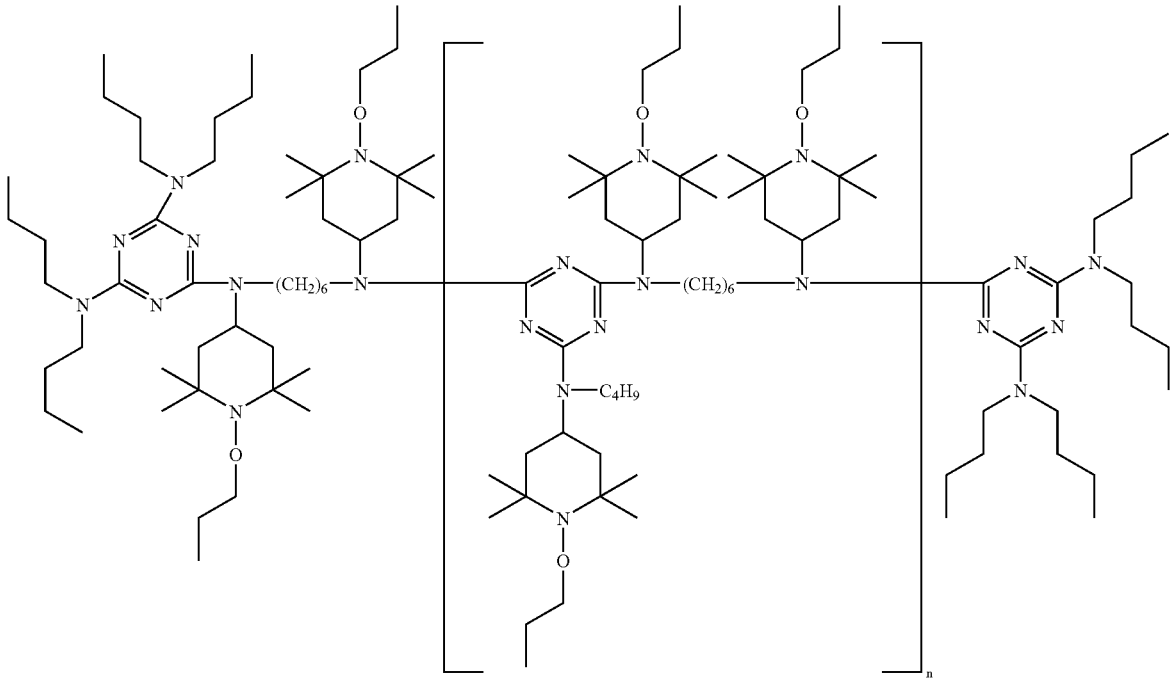

Hydroxylamine stabilizers of component (b) are for example those disclosed in U.S. Pat. Nos. 4,590,231, 4,668,721, 4,691,015, 4,831,134, 5,006,577, and 5,064,883, the relevant parts of which are incorporated herein by reference.

Compound (o) is disclosed in example 2 of U.S. Pat. No. 6,117,995.

The sterically hindered alkoxyamine or hydroxyalkoxyamine is for example the reaction product of 2,4-bis

[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6]; bis(1-octyloxy-2,2,6,6-tetramethylpiperidin-4-yl) sebacate; or the compounds (i), (j), (k) or (o); or mixtures of said hindered alkoxyamines and hydroxyalkoxyamines.

Component (i) is advantageously contained in the composition of the invention in an amount from about 0.1 to about 10% by weight based on the polymeric substrate (A); for example from about 0.25 to about 8% by weight; for instance from about 0.5 to about 3% by weight.

Phosphazene Flame Retardants of Component (ii)

The phosphazene flame retardants (FR's) of component (ii) are well known in the art. They are disclosed for example in EP1104766, JP07292233, DE19828541, DE1988536, JP11263885, U.S. Pat. Nos. 4,107,108, 4,108,805 and 4,079,035. The relevant disclosures of the U.S. Patents are hereby incorporated by reference.

The present phosphazene flame retardants are for example of the formula

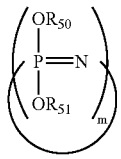

wherein m is 3 to 25, $R_{50}$ and $R_{51}$ are independently straight or branched chain alkyl of 1 to 18 carbon atoms, aralkyl of 7 to 18 carbon atoms, aryl of 6 to 12 carbon atoms, or perfluoroalkyl of 1 to 18 carbon atoms; or said alkyl, aralkyl or aryl substituted by 1 to 3 groups selected from $C_1$ to $C_{10}$alkyl, halogen, nitro, cyano, $C_1$ to $C_{10}$alkoxy, phenoxy, amino, $C_1$ to $C_{10}$alkylamino, $C_1$ to $C_{10}$dialkylamino, phenylamino or diphenylamino.

Examples of $R_{50}$ and $R_{51}$ include methyl, ethyl, n-propyl, isopropyl, n-butyl, tert-butyl, n-octyl, tert-octyl, phenyl, tolyl, xylyl, benzyl, phenethyl, cumyl, methyoxyphenyl, propoxyphenyl, p-nitrophenyl, —$CH_2CF_3$, —$CH_2C_3F_7$, $CH_2C_3F_6CF_2H$, 2,2,3,3-tetrafluoropropyl, 3,4-dichlorophenyl, 4-bromophenyl, 2-chlorophenyl, 2-chloroethoxyphenyl, and the like. $R_{50}$ and $R_{51}$ are for example independently methyl, phenyl, p-tolyl or m-tolyl.

For example, m is 3 or 4 and $R_{50}$ and $R_{51}$ are independently selected from methyl, phenyl and p-tolyl.

Component (ii) is advantageously contained in the composition of the invention in an amount from about 0.01 to about 20% by weight based on the polymeric substrate (A); for example about 0.05 to about 10% by weight; for instance about 0.1 to about 5% by weight.

Conventional Flame Retardants of Component (iii)

The halogenated flame retardants useful as component (iii) in compositions of the present invention may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art, see e.g. U.S. Pat. No. 4,579,906 (e.g. col. 3, lines 30-41), U.S. Pat. No. 5,393,812; see also Plastics Additives Handbook, Ed. by H. Zweifel, 5$^{th}$ Ed., Hanser Publ., Munich 2001, pp. 681-698.

The halogenated flame retardant is for example a chlorinated or brominated compound, e.g. selected from the following compounds:

Chloroalkyl phosphate esters (ANTIBLAZE®AB-100, Albright & Wilson; FYROL®FR-2, Akzo Nobel),
polybrominated diphenyl oxide (DE-60F, Great Lakes Corp.),
decabromodiphenyl oxide (DBDPO; SAYTEX®102E),
tris[3-bromo-2,2-bis(bromomethyl)propyl]phosphate (PB 370®, FMC Corp.),
bis(2,3-dibromopropyl ether) of bisphenol A (PE68),
brominated epoxy resin,
ethylene-bis(tetrabromophthalimide) (SAYTEX®BT-93),
bis(hexachlorocyclopentadieno)cyclooctane (DECLORANE PLUS®),
chlorinated paraffins,
1,2-bis(tribromophenoxy)ethane (FF680),
tetrabromo-bisphenol A (SAYTEX®RB100),
ethylene bis-(dibromo-norbornanedicarboximide) (SAYTEX®BN-451),
bis-(hexachlorocyclopentadieno) cyclooctane,
tris-(2,3-dibromopropyl)-isocyanurate,
ethylene-bis-tetrabromophthalimide.

Specific examples of component (iii) are brominated flame retardants.

Component (iii) is advantageously contained in the composition of the invention in an amount from about 0.5 to about 45% by weight of the polymeric substrate (A); for instance about 3 to about 40%; for example about 5 to about 35% by weight of component (A).

The ratio (parts by weight) of components (i): (ii): (iii) is for example within (1-20 parts of component (i)): (1 part of component (ii)): (10-200 parts of component (iii)).

The amount of component (iii) used also depends on the effectiveness of the specific compound(s), the polymer and the specific application type; for example, an amount of 5 to 15% by weight of the compound tris[3-bromo-2,2-bis(bromomethyl)propyl]phosphate may be as efficient as an amount of 30 to 45% by weight of the compound decabromodiphenyl oxide in respect of the flame retardancy of the final composition.

The resulting stabilized compositions of the invention may optionally also contain various conventional additives, for example in amounts from about 0.01 to about 10%, for instance from about 0.025 to about 4%, for example from about 0.1 to about 2% by weight of component (A), such as the materials listed below, or mixtures thereof.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)4-nonylphenyl], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl) pentane.

1.7. O—, N— and S-benzyl compounds, for example 3,5,3',5'-tetra-tert-butyl4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl4-hydroxyphenylpropionyl)-hexahydro-1,3,5-triazine, 1,3,5-tris(3,5-dicyclohexyl4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3.5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4- hydroxyphenylpropionyl)-hydrazide, N,N'-bis[2-(3-[3,5-di-tert-butyl-4-hydroxyphenyl]propionyloxy)ethyl] oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyl-diphenylamine, 4-n-butylaminophenol, 4-butyrylaminophenol, 4-nonanoylaminophenol, 4-dodecanoylaminophenol, 4-octa-decanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N', N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethyl-butyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyidiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$ where R=3'-tert-butyl-4'-hydroxy-5'-2H-benzortiazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl4-piperidyl)succinate, bis(1,2,2,6,6-pentamethyl4-piperidyl)sebacate, bis(1-octyloxy-2,2,6,6-tetramethyl-4-piperidyl)sebacate, bis(1,2,2,6,6-pentamethyl4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl4-piperidyl) hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro [4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)

hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6-dichloro-1,3,5-triazine, a condensation product of 1,2-bis (3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N, N'-bis-formyl-N, N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl4-piperidyl)]siloxane, reaction product of maleic acid anhydride-a-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis (3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl) 4,6-bis(2,4-dimethylphenyl)-1,3,5-triazine, 2,4-bis(2-hydroxy4-propyloxyphenyl)-6-(2,4-dimethylphenyl)-1,3,5-triazine, 2-(2-hydroxy-4-octyloxyphenyl)4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1, 3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butyl-phenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Specific Examples are the Following Phosphites:

Tris(2,4-di-tert-butylphenyl) phosphite (Irgafos®168, Ciba-Geigy), tris(nonylphenyl) phosphite,

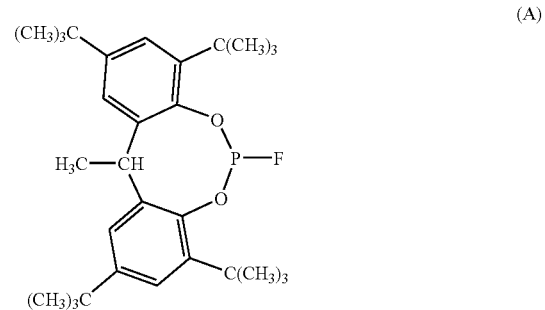

(A)

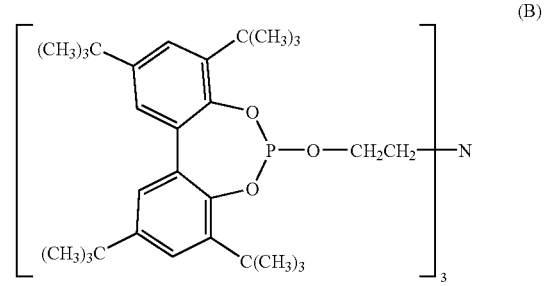

(B)

-continued

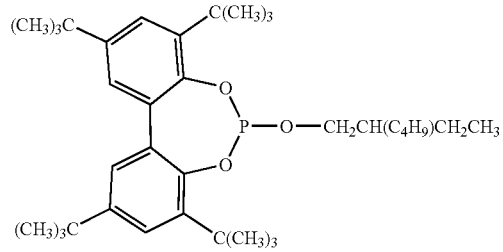
(C)

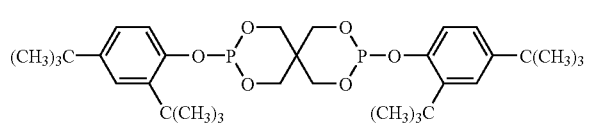
(D)

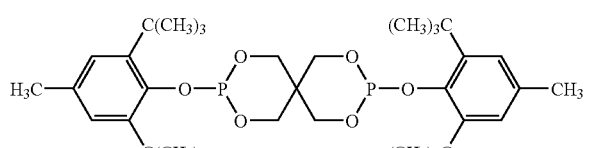
(E)

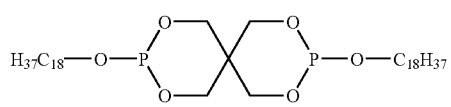
(F)

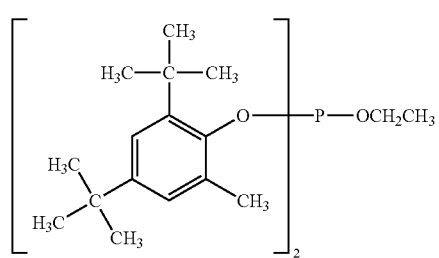
(G)

5. Hydroxylamines, for example, N,N-dibenzylhydroxylamine, N, N-diethylhydroxylamine, N,N-dioctylhydroxylamine, N,N-dilaurylhydroxylamine, N, N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, for example, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers). Specific examples are 1,3:2,4-bis(3',4'-dimethylbenzylidene)sorbitol, 1,3:2,4-di(paramethyldibenzylidene)sorbitol, und 1,3:2,4-di(benzylidene)sorbitol.

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl) benzofuran-2-one], 5,7-di-tert-butyl-3-(4-ethoxyphenyl) benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-2-one.

15. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide. U.S. Pat. Nos. 5,844,029 and 5,880,191 disclose the use of saturated hydrocarbon amine oxides towards the stabilization of thermoplastic resins. It is disclosed that the thermoplastic compositions may further contain a stabilizer or mixture of stabilizers selected from phenolic antioxidants, hindered amine light stabilizers, ultraviolet light absorbers, organic phosphorus compounds, alkaline metal salts of fatty acids and thiosynergists. The co-use of amine oxides with other stabilizers towards stabilizing polyolefins is not exemplified.

The compositions may also contain a further flame retardant, for instance an organic phosphite or phosphate, such as tetraphenyl resorcinol diphosphite (e.g. FYROLFLEX®RDP, Akzo Nobel), triphenyl phosphate, ammonium polyphosphate (APP; e.g. HOSTAFLAM® AP750),
resorcinol diphosphate oligomer (RDP),
melamine phosphates,
melamine pyrophosphates,
ethylenediamine diphosphate (EDAP).

Specific examples of additives are phenolic antioxidants (item 1 of the list), further sterically hindered amines (item 2.6 of the list), light stabilizers of the benzotriazole and/or o-hydroxyphenyltriazine class (items 2.1 and 2.8 of the list), phosphites and phosphonites (item 4 of the list) and peroxide-destroying compounds (item 5.) of the list.

Additional specific examples of additives (stabilizers) which are benzofuran-2-ones, such as described, for example, in U.S. Pat. Nos. 4,325,863, 4,338,244 or 5,175,312.

The instant composition can additionally contain another UV absorber selected from the group consisting of the s-triazines, the oxanilides, the hydroxybenzophenones, benzoates and the α-cyanoacrylates. Particularly, the instant composition may additionally contain an effective stabilizing amount of at least one other 2-hydroxyphenyl-2H-benzotriazole; another tris-aryl-s-triazine; or hindered amine or mixtures thereof. For example, additional components are selected from pigments, dyes, plasticizers, antioxidants, thixotropic agents, levelling assistants, basic costabilizers, further light stabilizers like UV absorbers and/or sterically hindered amines, metal passivators, metal oxides, organophosphorus compounds, hydroxylamines, and mixtures thereof, especially pigments, phenolic antioxidants, calcium stearate, zinc stearate, UV absorbers of the 2-(2'-hydroxyphenyl)benzotriazole and 2-(2-Hydroxyphenyl)-1,3,5-triazine classes, and sterically hindered amines.

The additives of the invention and optional further components may be added to the polymer material individually or mixed with one another. If desired, the individual components can be mixed with one another before incorporation into the polymer for example by dry blending, compaction or in the melt. Subject of the invention therefore is also a flame retardant additive combination comprising
(i) at least one compound selected from the group consisting of the
  (a) sterically hindered nitroxyl stabilizers,
  (b) sterically hindered hydroxylamine stabilizers and
  (c) sterically hindered alkoxyamine stabilizers and
(ii) at least one phosphazene flame retardant and optionally
(iii) a conventional flame retardant, for example a flame retardant selected from the group consisting of the halogenated flame retardants.

Conveniently, the additives of above components (i), (ii), optionally (iii) and possibly further additives as described above may be dry blended and then extruded, for instance in a twin screw extruder at 180-220° C., with or without nitrogen atmosphere. The material thus obtained may be further processed according to known methods. The surface of the articles formed do not show any loss of gloss or any kind of roughness.

Further, the instant invention pertains to a process for imparting light stability and flame retardancy to an organic polymeric substrate, which process comprises adding to said polymeric substrate a combination of an effective flame retarding amount of a synergistic mixture of
(i) at least one compound selected from the group consisting of the
  (a) sterically hindered nitroxyl stabilizers,
  (b) sterically hindered hydroxylamine stabilizers and
  (c) sterically hindered alkoxyamine stabilizers and
(ii) at least one phosphazene flame retardant and optionally
(iii) a conventional flame retardant, for example a flame retardant selected from the group consisting of the halogenated flame retardants.

The incorporation of the additives of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additve or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is for example carried out in an extruder or in a kneader. It is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is for instance carried out in an extruder by introducing the additive during processing.

Specific examples of suitable processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion,* Vol. 1 Grundlagen, Editors F. Hensen, W. Knappe, H. Potente, 1989, pp. 3-7, ISBN:3-446-14339-4 (Vol. 2 *Extrusionsanlagen* 1986, ISBN 3-446-14329-7).

For example, the screw length is 1-60 screw diameters, for example 35-48 screw diameters. The rotational speed of the screw is for instance 10-600 rotations per minute (rpm), for example 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The additives of the invention and optional further additives can also be sprayed onto the polymer material. They are able to dilute other additives (for example the conventional additives indicated above) or their melts so that they can be sprayed also together with these additives onto the material. Addition by spraying during the deactivation of the polymerization catalysts is particularly advantageous; in this case, the steam evolved may be used for deactivation of the catalyst. In the case of spherically polymerized polyolefins it may, for example, be advantageous to apply the additives of the invention, optionally together with other additives, by spraying.

The additives of the invention and optional further additives can also be added to the polymer in the form of a masterbatch ("concentrate") which contains the components in a concentration of, for example, about 1% to about 40%, for example about 2% to about 20% by weight incorporated in a polymer. The polymer must not be necessarily of identical structure than the polymer where the additives are added finally. In such operations, the polymer can be used in the form of powder, granules, solutions, suspensions or in the form of latices.

Incorporation can take place prior to or during the shaping operation. The materials containing the additives of the invention described herein are for example used for the production of molded articles, for example rotomolded articles, injection molded articles, profiles and the like. Thus, a molded polymer article made flame retardant by the incorporation of
(i) at least one compound selected from the group consisting of the
  (a) sterically hindered nitroxyl stabilizers,
  (b) sterically hindered hydroxylamine stabilizers and
  (c) sterically hindered alkoxyamine stabilizers and
(ii) at least one phosphazene flame retardant and optionally
(iii) a conventional flame retardant, is another object of the invention.

It is also contemplated that PTFE, polytetrafluoroethylene (for example Teflon® 6C; E. I. Du Pont), may be advantageously added to the present compositions as an additional flame retardant, as disclosed in U.S. application No. 60/312,517, filed Aug.15, 2001.

The effective flame retarding amount of component (B) is that needed to show flame retarding efficacy as measured by one of the standard methods used to assess flame retardancy. These include the NFPA 701 Standard Methods of Fire Tests for Flame-Resistant Textiles and Films, 1989 and 1996 editions; the UL 94 Test for Flammability of Plastic Materials for Parts in Devices and Appliances, 5th Edition, Oct. 29, 1996; Limiting Oxygen Index (LOI), ASTM D-2863; and Cone Calorimetry, ASTM E-1354. Ratings according to the UL 94 V test are as compiled in the following table:

| Rating | Afterflame time | Burning drips | Burn to Clamp |
| --- | --- | --- | --- |
| V-0 | <10 s | no | no |
| V-1 | <30 s | no | no |
| V-2 | <30 s | yes | no |
| Fail | <30 s | | yes |
| Fail | >30 s | | no |

Coadditives found particularly useful for use with the instant compounds of components (a)-(o) in flame retardant compositions are as follows:

UV Absorbers:
2-(2-hydroxy-3,5-di-α-cumylphenyl)-2H-benzotriazole, (TINUVIN® 234, Ciba Specialty Chemicals Corp.);
2-(2-hydroxy-5-methylphenyl)-2H-benzotriazole, (TINUVIN® P, Ciba Specialty Chemicals Corp.);
5-chloro-2-(2-hydroxy-3,5-di-tert-butylphenyl)-2H-benzotriazole, (TINUVIN® 327, Ciba Specialty Chemicals Corp.);
2-(2-hydroxy-3,5-di-tert-amylphenyl)-2H-benzotriazole, (TINUVIN® 328, Ciba Specialty Chemicals Corp.);
2-(2-hydroxy-3-o-cumyl-5-tert-octylphenyl)-2H-benzotriazole, (TINUVIN® 928, Ciba Specialty Chemicals Corp.);
2,4-di-tert-butylphenyl 3,5-di-tert-butyl-4-hydroxybenzoate, (TINUVIN® 120, Ciba Specialty Chemicals Corp.);
2-hydroxy-4-n-octyloxybenzophenone, (CHIMASSORB® 81, Ciba Specialty Chemicals Corp.);
2,4-bis(2,4-dimethyphenyl)-6-(2-hydroxy-4-octyloxyphenyl)-s-triazine, (CYASORB® 1164, Cytec).

The following examples are meant for illustrative purposes only and are not to be construed to limit the scope of this invention in any manner whatsoever. Where given, room temperature depicts a temperature in the range 20-25° C. Percentages are by weight of the polymer substrate unless otherwise indicated.

Test Methods

NFPA 701 Standard Methods of Fire Tests for Flame-Resistant Textiles and Films, 1989 and 1996 editions;
UL 94 Test for Flammability of Plastic Materials for Parts in Devices and Appliances, 5th Edition, Oct. 29, 1996;
Limiting Oxygen Index (LOI), ASTM D-2863;
Cone Calorimetry, ASTM E-1 or ASTM E 1354;
ASTM D 2633-82, burn test.

Test Compounds

NO.1 is bis(1-oxyl-2,2,6,6-tetramethylpiperidin-4-yl) sebacate, (Prostab™ 5415, Ciba Specialty Chemicals Corp.),
NOH-1 is bis(1-hydroxy-2,2,6,6-tetramethylpiperidin-4-yl) sebacate,
NOR-1 is the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6];
NOR-2 is 1-cyclohexyloxy-2,2,6,6-tetramethyl-4-octadecylaminopiperidine;
NOR-3 is bis(1-octyloxy-2,2,6,6-tetramethylpiperidin-4-yl) sebacate;
NOR-4 is 2,4-bis[(1-cyclohexyloxy-2,2,6,6-tetramethylpiperidin-4-yl)butylamino]-6-(2-hydroxy-ethylamino-s-triazine;
NOR-5 is bis(1-cyclohexyloxy-2,2,6,6-tetramethylpiperidin-4-yl) adipate;
NOR-6 is 1-(2-hydroxy-2-methylpropoxy)-4-octadecanoyloxy-2,2,6,6-tetramethylpiperidine.
DBDPO is decabromodiphenyl oxide,
FR-1 is tris[3-bromo-2,2-bis(bromomethyl)propyl] phosphate, (PB 370®, FMC Corp.).
FR-2 is ammonium polyphosphate (APP).
FR-3 is bis(2,3-dibromopropyl) ether of tetrabromobisphenol A (PE68).
FR-4 is ammonium polyphosphate/synergist blend, HOSTAFLAM® AP750.
FR-5 is decabromodiphenyl oxide (DBDPO; obtained from Dead Sea Bromine).
FR-6 is ethylene bis-(tetrabromophthalimide), (SAYTEX® BT-93).
FR-7 is melamine phosphate, MELAPUR® P 46.
FR-8 is ammonium polyphosphate, EXOLIT® AP752,
PHOSZ-1 is a mixed phosphazene of the present formula where m is 3 and 4 and $R_{50}$ and $R_{51}$ are phenyl and methyl, KEMIDANT 102, Chemipro.

PHOSZ-2 is a mixed phosphazene of the present formula where m is 3 and 4 and $R_{50}$ and $R_{51}$ are phenyl and p-tolyl, KEMIDANT 302S, Chemipro.

EXAMPLE 1

Molding grade polypropylene (Profax® 6501; Montell) is dry blended with the test additives and then melt compounded in a twin screw extruder at 220° C. Base stabilization is 500 ppm N,N-di(alkyl)hydroxylamine produced by the direct oxidation of N,N-di(hydrogenated tallow)amine (Irgastab® FS-042) and 500 ppm calcium stearate. Plaques (125 mil) are prepared by injection molding from the formulations using a Boy Injection Molder at 475° F. (246° C.). The specimens are tested for flame retardancy according to the UL-94 vertical burn test specifications.

The results are shown below. V-0 is the highest rating for the UL-94 test, V-2 is another, lower test rating as described above. Additives are reported in weight percent based on the polymer.

| Formulation | NOR-1 | PHOSZ-1 | PHOSZ-2 | DBDPO | FR-1 | Rating |
|---|---|---|---|---|---|---|
| 1 | — | — | — | — | 13 | V2 |
| 2 | — | — | 20 | — | — | fail |
| 3 | — | 5 | — | 25 | — | fail |
| 4 | — | — | 5 | 25 | — | fail |
| 5 | — | 5 | — | — | 15 | V2 |
| 6 | — | — | 1 | — | 15 | V2 |
| 7 | — | — | 5 | — | 13 | V2 |
| 8 | — | — | 3 | — | 15 | V0 |
| 9 | 1 | — | 10 | — | — | V2 |
| 10 | 1 | — | 5 | — | — | fail |
| 11 | 1 | — | 10 | — | 5 | V0 |
| 12 | 1 | — | 1 | — | 10 | V0 |
| 13 | 1 | — | 1 | — | 5 | V2 |

Comparing formulations 2 and 9, it is clear that the combination of an N-alkoxy hindered amine and a phosphazene flame retardant is synergistic towards providing a polyolefin with flame retardant properties. Comparing formulations 6-8 to 11-13, it is clear that a three-way synergism exists between N-alkoxy hindered amines, phosphazene flame retardants, and a halogenated flame retardant towards providing a polyolefin with flame retardant properties. The levels of all three additives may be kept to a minimum while achieving high flame retardant ratings.

EXAMPLE 2

Polyethylene fibers are prepared from fiber grade polyethylene by dry blending with test additives and melt compounding at 400° F. Fibers are extruded from this formulation using a Hills laboratory scale fiber extruder. Socks are knitted from the fibers and are tested for flame retardancy according to NFPA 701 vertical burn method. Polyethylene fibers contain 0.5%, 1% or 2% of an additive of present compounds (a)-(o) in combination with 10% by weight of a classic brominated flame retardant decabromodiphenyl oxide (DBDPO); bis(2,3-dibromopropyl) ether of tetrabromobis phenol A (PE68); or ethylene bis-tetrabromophthalimide (SAYTEX® BT-93); and 0.1% by weight of PHOSZ-1 or PHOSZ-2. These formulated fibers are tested for flame retardancy according to NFPA 701.

The fibers containing both an additive of components (a)-(o) of the present invention together with phosphazene and a classic brominated flame retardant exhibit enhanced flame retardancy compared to the classic flame retardant alone.

EXAMPLE 3

Molding grade polypropylene (Profax® 6501; Montell) is dry blended with the test additives given below and then melt compounded in a twin screw extruder at 200° C. under nitrogen. Base stabilization is 500 ppm N,N-di(alkyl)hydroxylamine produced by the direct oxidation of N,N-di(hydrogenated tallow)amine (Irgastab® FS-042) and 500 ppm calcium stearate. Plaques (125 mil) are prepared by injection molding from the formulations using a Boy Injection Molder at 475° F. (246° C.). The specimens are tested for flame retardancy according to the UL-94 vertical burn test specifications. The results are shown below.

The plaques are tested for flame retardancy by the UL 94V thick section test. The ratings achievable are V-0 (best rating), V-1, and V-2. Additive levels are reported in weight percent based on the total composition.

| Formulation | Additive | UL-94 Rating |
|---|---|---|
| 1 (control) | none | fail |
| 2 | 10% FR-1 | V-2 |
| 3 | 10% FR-1 + 4% $Sb_2O_3$ | V-2 |
| 4 | 10% FR-1 + 1.0% PHOSZ-2 | V-2 |
| 5 | 10% FR-1 + 1.0% NOR-1 | V-2 |
| 6 | 10% FR-1 + 1.0% NOR-1 + 1.0% PHOSZ-2 | V-0 |

The results show that the requirements of the V-0 rating in the UL-94 vertical burning test are only met by the composition of present invention (formulation No. 6).

EXAMPLE 4

Foam grade polyethylene is dry blended with test additives and then melt compounded into pellets. The pelletized fully formulated resin is then blown into foam.

The polyethylene foam prepared contains an instant additive of compounds (a)-(o) in combination with a classic brominated flame retardant FR-1, FR-3, FR-5 (DBDPO), or FR-6, and 0.1% of PHOSZ-1 or PHOSZ-2. The formulated foam is tested for flame retardancy according to the UL-94 burn test method.

The foam containing both an additive of present components (a)-(o) together with PHOSZ-1 or PHOSZ-2 and a classic brominated flame retardant exhibits enhanced flame retardancy compared to foam containing the classic halogenated flame retardant alone.

EXAMPLE 5

Wire & cable grade polyethylene is dry blended with test additives and then melt compounded into pellets. The pelletized fully formulated resin is then extruded onto wire.

Test specimens are tested for flame retardancy using the ASTM D 2633-82 burn test conditions. The formulations containing both a compound of the present invention selected from compounds (a)-(o) and a classic brominated flame retardant FR-1, FR-3, FR-5 (DBDPO), or FR-6 together with 0.2% of PHOSZ-1 or PHOSZ-2 exhibits enhanced flame retardancy compared to the classic halogenated flame retardant alone.

EXAMPLE 6

Fiber grade polyethylene is dry-blended with test additives. In addition to a compound of present components (a)-(o), selected brominated flame retardants together with PHOSZ-1 or PHOSZ-2 are also included in the various formulations. Non-woven fabrics are produced from the polymer blend formulations by a spun-bonded or melt-blown process.

The non-woven fabrics made thereby are tested for flame retardancy according to the NFPA 701 vertical burn test specifications. The fabrics containing the present compounds (a)-(o) together with PHOSZ-1 or PHOSZ-2 and selected brominated flame retardants exhibit flame retardancy.

EXAMPLE 7

Fiber grade polypropylene is dry-blended with test additives. In addition to a present compound (a)-(o), selected brominated flame retardants and PHOSZ-1 or PHOSZ-2 are also included in the various formulations. Non-woven fabrics are produced from the polymer blend formulations by a spun-bonded or melt-blown process.

The non-woven fabrics made thereby are tested for flame retardancy according to the NFPA 701 vertical burn test specifications. The fabrics containing an additive selected from present components (a)-(o) together with PHOSZ-1 or PHOSZ-2 and selected brominated flame retardants exhibit flame retardancy.

EXAMPLE 8

Molding grade polystyrene is dry-blended with test additives and then melt compounded. In addition to an additive selected from present components (a)-(o), selected brominated flame retardants and PHOSZ-1 or PHOSZ-2 are also included in the test formulations. Specimens are injection molded from these test formulations.

The specimens are tested for flame retardancy according to the UL-94 burn test specifications. The molded specimens containing the present compounds (a)-(o) together with PHOSZ-1 or PHOSZ-2 and selected brominated flame retardants exhibit flame retardancy.

EXAMPLE 9

Foam grade polystyrene is dry-blended with test additives and then melt compounded. In addition to an additive selected from present components (a)-(o) and PHOSZ-1 or PHOSZ-2, selected brominated flame retardants are also included in these test formulations. Foam polystyrene specimens are prepared from these test formulations.

The specimens are tested for flame retardancy according to the UL-94 burn test specifications. The foam specimens containing the present compounds selected from components (a)-(o) together with PHOSZ-1 or PHOSZ-2 and brominated flame retardants exhibit flame retardancy.

EXAMPLE 10

Molding grade ABS is dry blended with the an additive selected from present components (a)-(o) and PHOSZ-1 or PHOSZ-2 and selected brominated flame retardants, then melt compounded at 425° F. (218° C.). Specimens 125 mil (⅛") thick are then injection molded from this formulation using a Boy Injection Molder at 450° F. (232° C.). The specimens are tested for flame retardancy according to the UL-94 vertical burn test specifications.

The specimens containing the present compounds selected from components (a)-(o) together with PHOSZ-1 or PHOSZ-2 and brominated flame retardants exhibit flame retardancy.

EXAMPLE 11

Fiber grade polypropylene is dry blended with an additive selected from the present components (a)-(o), PHOSZ-1 or PHOSZ-2 and a select brominated flame retardant and then melt compounded at 234° C. (450° F.) into pellets. The pelletized fully formulated resin is then spun at 246° C. (475° F.) into fiber using a Hills laboratory model fiber extruder. The spun tow of 41 filaments is stretched at a ratio of 1:3.2 to give a final denier of 615/41.

Socks are knitted from the stabilized polypropylene fiber on a Lawson-Hemphill Analysis Knitter and tested under NFPA 701 vertical burn procedure. The time in seconds for the knitted sock to extinguish after the insult flame is removed is reported as "After Flame". Both the maximum time for any one replicate and the total time for ten replicates are measured. Efficacy as a flame retardant is demonstrated when low After Flame times are observed relative to a blank sample containing no flame retardant.

The specimens containing the present compounds selected from components (a)-(o) together with PHOSZ-1 or PHOSZ-2 and brominated flame retardants exhibit flame retardancy.

EXAMPLE 12

Film grade polyethylene is dry blended with the with an additive selected from the present components (a)-(o), together with PHOSZ-1 or PHOSZ-2 and a select brominated flame retardant, and then melt compounded into pellets. The pelletized fully formulated resin is then blown at 205° C. using a MPM Superior Blown film extruder.

The films are tested for flame retardancy under NFPA 701 test conditions. The specimens containing the present compounds selected from (a)-(o) together with PHOSZ-1 or PHOSZ-2 and brominated flame retardants exhibit flame retardancy.

Film grade polypropylene is handled in a similar fashion and polypropylene films containing the instant component also show flame retardancy.

EXAMPLE 13

Molded test specimens are prepared by injection molding thermoplastic olefin (TPO) pellets containing a present test compound selected from compounds (a)-(o) and a select brominated flame retardant together with PHOSZ-1 or PHOSZ-2. The TPO formulations may also contain a pigment, a phosphite, a phenolic antioxidant or hydroxylamine, a metal stearate, a UV absorber or a hindered amine stabilizer or a mixture of hindered amine and UV absorber.

Pigmented TPO formulation composed of polypropylene blended with a rubber modifier where the rubber modifier is an in-situ reacted copolymer or blended product containing copolymers of propylene and ethylene with or without a ternary component such as ethylidene norbornene are stabilized with a base stabilization system consisting of an N,N-dialkylhydroxylamine or a mixture of hindered phenolic antioxidant and an organophosphorus compound.

The TPO plaques are tested for flame retardancy using the UL-94 Vertical Burn conditions. A minimum of three replicates are tested. Efficacy as a flame retardant is measured relative to a blank sample containing no flame retardant.

The specimens containing the present compounds (a)-(o), PHOSZ-1 or PHOSZ-2 and brominated flame retardants exhibit flame retardancy.

EXAMPLE 14

Film grade ethylene/vinyl acetate (EVA) copolymers containing 20 weight percent or less of vinyl acetate are dry blended with test additives and then melt compounded into pellets. The pelletized fully formulated resin is then blown into a film at 205° C. using a MPM Superior Blown-film extruder.

The films are tested for flame retardancy under NFPA 701 test conditions. The films containing the present compounds selected from components (a)-(o) together with PHOSZ-1 or PHOSZ-2 and brominated flame retardants exhibit flame retardancy.

Film grade low density polyethylene (LDPE) which contains some linear low density polyethylene (LLDPE) and/or ethylene/vinyl acetate (EVA) are dry blended with test additives and blown into film as described above for EVA copolymer resin. The films are tested for flame retardancy under NFPA 701 test conditions and those containing the present compounds selected from components (a)-(o) together with PHOSZ-1 or PHOSZ-2 and brominated flame retardants exhibit flame retardancy.

EXAMPLE 15

High impact polystyrene (HIPS) polymer (STYRON® 484C, Dow Chemical Co.) is compounded with a present compound of components (a)-(o) together with PHOSZ-1 or PHOSZ-2 and a selected brominated flame retardant, pelletized and then injection or compression molded into plaques. These plaques are tested for flame retardant efficacy using cone calorimetry, LOI or UL-94 test method.

The plaques containing an instant compound of component (a)-(o), PHOSZ-1 or PHOSZ-2 and a select brominated flame retardant exhibit flame retardancy. Flame retardant HIPS polymers find application in housings for business machines.

EXAMPLE 16

This Example shows the efficacy of the present compounds in PVC formulations. Such formulations are useful in flexible or rigid PVC and in wire and cable applications. Typical formulations are seen below:

| Component | parts | parts | parts | parts |
| --- | --- | --- | --- | --- |
| PVC resin | 100 | 100 | 100 | 100 |
| tin mercaptide | 1.5 | — | 2.0 | — |
| tin carboxyate | — | 2.5 | — | 2.0 |
| process aid | 1.5 | 1.5 | 2.0 | 2.0 |
| impact mod. | 6.0 | 6.0 | 7.0 | 7.0 |
| paraffin wax | 1.0 | 0.3 | 1.0 | 1.0 |
| polyethyl wax | 0.1 | 0.1 | 0.2 | 0.2 |
| Ca stearate | 1.0 | — | 0.8 | — |
| pigment | 1.0 | 0.9 | 5.0 | 5.0 |

Fully formulated PVC containing one of the present compounds (a)-(o) together with PHOSZ-1 or PHOSZ-2 and a known halogenated flame retardant is pelletized and then injection molded into test plaques for examination of flame retardancy using the UL-94 or LOI test method.

The PVC plaques containing the instant compounds (a)-(o), PHOSZ-1 or PHOSZ-2 and a classic halogenated flame retardant demonstrate flame retardancy.

EXAMPLE 17

Fiber grade poly(ethylene terephthalate) (PET) is dry blended with a test additive (a)-(o), PHOSZ-1 or PHOSZ-2 and a classic brominated flame retardant, then melt compounded at 550° F. and then pelletized. The polyester pellets are dried at 175° F. for 24 hours under vacuum. The dried pellets are extruded into fibers using a Hills laboratory scale fiber extruder at 550° F. Socks are knitted from these fibers and tested for flame retardancy according to NFPA 701 test method.

The fibers containing both a present compound (a)-(o), PHOSZ-1 or PHOSZ-2 and a classic brominated flame retardant exhibit enhanced flame retardancy compared to the classic flame retardant alone.

EXAMPLE 18

Thermoplastic resins including polypropylene, polyethylene homopolymer, polyolefin copolymer or thermoplastic olefins (TPO), high impact polystyrene (HIPS) and ABS are dry blended with an instant compound (a)-(o), PHOSZ-1 or PHOSZ-2 and a classic brominated flame retardant and then melt compounded into pellets. The pelletized fully formulated resin is then processed into a useful article such as extrusion into fiber; blown or cast extrusion into film; blow molded into bottles; injection molded into molded articles, thermoformed into molded articles, extruded into wire and cable housing or rotation molded into hollow articles.

The articles containing the instant compounds (a)-(o) together with PHOSZ-1 or PHOSZ-2 and a known brominated flame retardant exhibit flame retardancy when tested by a known standard test method.

Polyethylene wire and cable applications are tested for flame retardancy according to ASTM D-2633-82 burn test method. The materials containing the instant compounds of components (a)-(o) together with PHOSZ-1 or PHOSZ-2 and a brominated flame retardant show flame retardancy.

EXAMPLE 19

Articles prepared according to Example 18 which additionally contain an organophosphorus stabilizer selected from the group consisting of tris(2,4-di-tert-butylphenyl) phosphite, bis(2,4-di-tert-butyl-6-methylphenyl) ethyl phosphite, 2,2',2"-nitrilo[triethyl-tris-(3,3',5,5'-tetra-tert-butyl-1,1'-biphenyl-2,2'-diyl) phosphite], tetrakis(2,4-di-butylphenyl) 4,4'-biphenylenediphosphonite tris(nonylphenyl) phosphite, bis(2,4-di-tert-butylphenyl) pentaerythrityl diphosphite, 2,2'-ethylidenebis(2,4-di-tert-butylphenyl) fluorophosphite and 2-butyl-2-ethylpropan-1,3-diyl 2,4,6-tri-tert-butylphenyl phosphite exhibit good flame retardancy properties.

EXAMPLE 20

Articles prepared according to Example 18 which additionally contain a o-hydroxy-phenyl-2H-benzotriazole, a hydroxyphenyl benzophenone or a o-hydroxyphenyl-s-triazine UV absorber selected from the group consisting of 2-(2-hydroxy-3,5-di-α-cumylphenyl)-2H-benzo-triazole, 2-(2-hydroxy-5-methylphenyl)-2H-benzotriazole, 5-chloro-2-(2-hydroxy-3,5-di-tert-butyl-phenyl)-2H-benzotriazole, 2-(2-hydroxy-3,5-di-tert-amylphenyl)-2H-benzotriazole, 2-(2-hydroxy-3-α-cumyl-5-tert-octylphenyl)-2H-benzotriazole, 2,4-di-tert-butylphenyl 3,5-di-tert-butyl-4-hydroxy-benzoate, 2-hydroxy-4-n-octyloxybenzophenone and 2,4-bis(2,4-dimethyphenyl)-6-(2-hydroxy-4-octyloxyphenyl)-s-triazine exhibit good flame retardancy.

EXAMPLE 21

Articles prepared according to Example 18 which additionally contain a o-hydroxy-phenyl-2H-benzotriazole, a hydroxyphenyl benzophenone or a o-hydroxyphenyl-s-triazine UV absorber selected from the group consisting of 2-(2-hydroxy-3,5-di-α-cumylphenyl)-2H-benzo-triazole, 2-(2-hydroxy-5-methylphenyl)-2H-benzotriazole, 5-chloro-2-(2-hydroxy-3,5-di-tert-butyl-phenyl)-2H-benzotriazole, 2-(2-hydroxy-3,5-di-tert-amylphenyl)-2H-benzotriazole, 2-(2-hydroxy-3-α-cumyl-5-tert-octylphenyl)-2H-benzotriazole, 2,4-di-tert-butylphenyl 3,5-di-tert-butyl-4-hydroxy-benzoate, 2-hydroxy-4-n-octyloxybenzophenone and 2,4-bis(2,4-dimethyphenyl)-6-(2-hydroxy-4-octyloxyphenyl)-s-triazine exhibit good flame retardancy properties.

EXAMPLE 22

Examples 1-21 are repeated where the compound of components (a)-(o) is selected from
(a) the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6];
(b) 1-cyclohexyloxy-2,2,6,6-tetramethyl-4-octadecylami-nopiperidine;
(c) bis(1-octyloxy-2,2,6,6-tetramethylpiperidin-4-yl) sebacate;
(d) 2,4-bis[(1-cyclohexyloxy-2,2,6,6-tetramethylpiperidin-4-yl)butylamino]-6-(2-hydroxy-ethylamino-s-triazine;
(e) bis(1-cyclohexyloxy-2,2,6,6-tetramethylpiperidin-4-yl) adipate;
(h) 2;4-bis[(1-cyclohexyloxy-2,2,6,6-piperidin-4-yl)buty-lamino]-6-chloro-s-triazine;
(i) 1-(2-hydroxy-2-methylpropoxy)-4-hydroxy-2,2,6,6-tetramethylpiperidine;
(j) 1-(2-hydroxy-2-methylpropoxy)-4-oxo-2,2,6,6-tetram-ethylpiperidine;
(k) 1-(2-hydroxy-2-methylpropoxy)-4-octadecanoyloxy-2,2,6,6-tetramethylpiperidine;
(l) bis(1-(2-hydroxy-2-methylpropoxy)-2,2,6,6-tetramethylpiperidin-4-yl) sebacate;
(m) bis(1-(2-hydroxy-2-methylpropoxy)-2,2,6,6-tetramethylpiperidin-4-yl) adipate;
(n) 2,4-bis{N-[1-(2-hydroxy-2-methylpropoxy)-2,2,6,6-tet-ramethylpiperidin-4-yl]-N-butyl-amino}-6-(2-hydroxy-ethylamino)-s-triazine; and
(o) the compound of formula

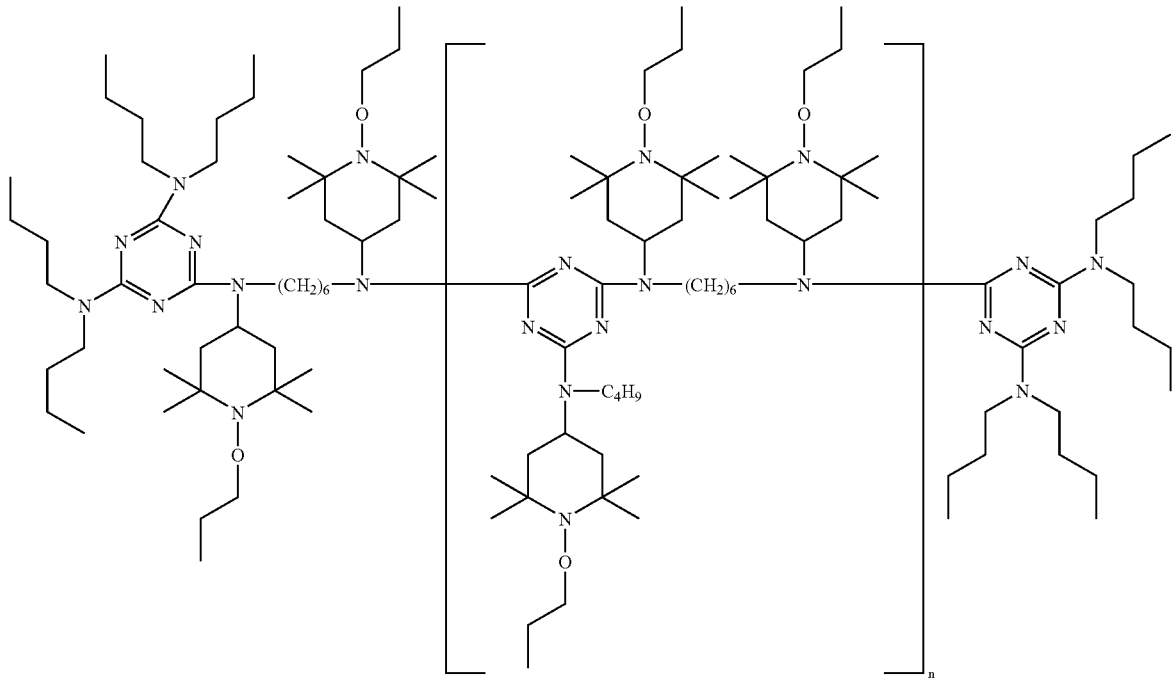

in which n is from 1 to 15;
and the halogenated flame retardant is selected from
decabromodiphenyl oxide (DBDPO; SAYTEX® 102E),
tris[3-bromo-2,2-bis(bromomethyl)propyl]phosphate (PB 370® , FMC Corp.),
bis(2,3-dibromopropyl ether) of bisphenol A (PE68),
ethylene-bis(tetrabromophthalimide) (SAYTEX® BT-93),
1,2-bis(tribromophenoxy)ethane (FF680),
tetrabromo-bisphenol A (SAYTEX® RB100),
ethylene bis-(dibromo-norbornanedicacboximide) (SAYTEX® BN-451), or
tris-(2,3-dibromopropyl)-isocyanurate.

Formulations containing an instant stabilizer selected from compounds (a)-(o) and a brominated flame retardant achieve good flame retardancy.

What is claimed is:

1. A flame retardant polyolefin composition which comprises
   (A) a polyolefin substrate and
   (B) an effective flame retarding amount of a synergistic mixture of
      (i) at least one compound selected from the group consisting of the sterically hindered alkoxyamine stabilizers and
      (ii) at least one phosphazene flame retardant, where the sterically hindered alkoxyamine stabilizers are of the formula

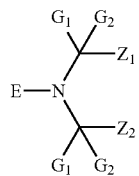

where
   $G_1$ and $G_2$ are independently alkyl of 1 to 8 carbon atoms or are together pentamethylene,
   $Z_1$ and $Z_2$ are each methyl, or $Z_1$ and $Z_2$ together form a linking moiety which may additionally be substituted by an ester, ether, amide, amino, carboxy or urethane group, and
   E is cyclohexyloxy, and
where the phosphazene is of the formula

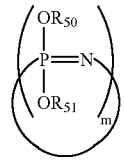

where m is 3 or 4 and $R_{50}$ and $R_{51}$ are independently selected from methyl, phenyl and p-tolyl.

2. A composition according to claim 1 further comprising
   (iii) tris[3-bromo-2,2-bis(bromomethyl)propyl] phosphate.

3. A composition according to claim 1 containing no antimony compounds or antimony compounds in an amount less than about 1% by weight based on the weight of the polyolefin component (A).

4. A composition according to claim 1 containing no filler or a filler in an amount less than about 3% by weight based on the weight of the polyolefin component (A).

5. A composition according to claim 1 in which the polyolefin component (A) is selected from polyethylene, polypropylene or copolymers thereof.

6. A composition according to claim 1 in which the molecular weight of the stabilizers of component (i) are in the range 170-10000 g/mol.

7. A composition according to claim 1 in which the stabilizers of component (i) are of the formula A-R

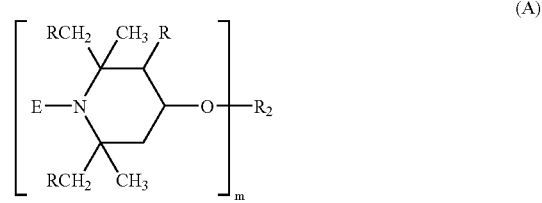
(A)

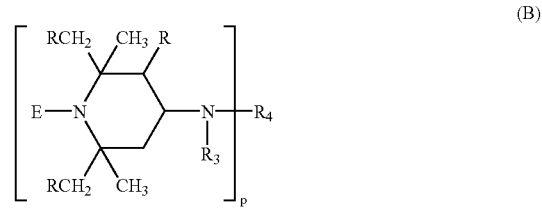
(B)

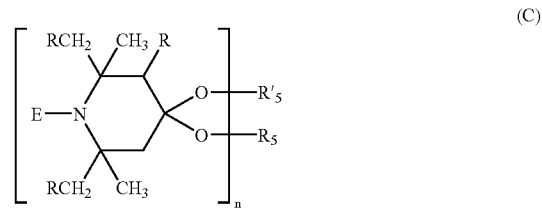
(C)

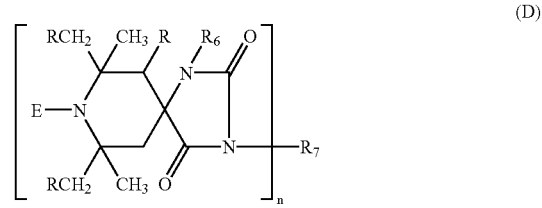
(D)

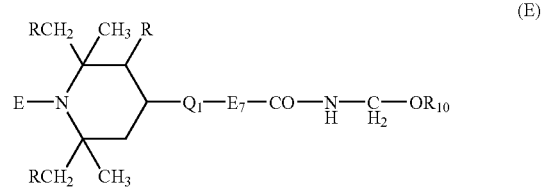
(E)

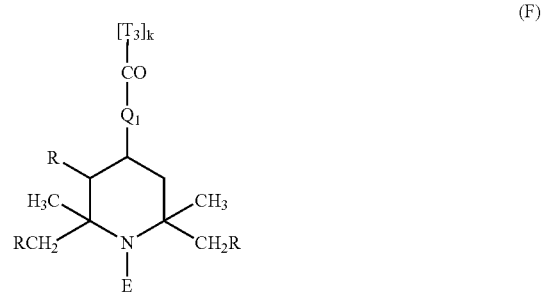
(F)

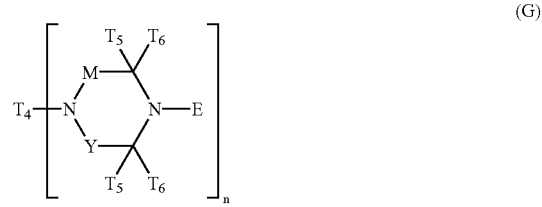
(G)

-continued

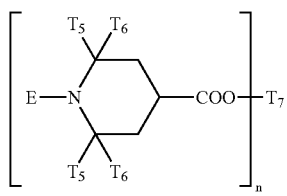
(H)

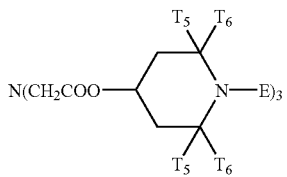
(I)

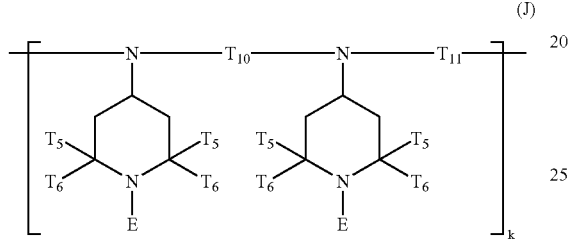
(J)

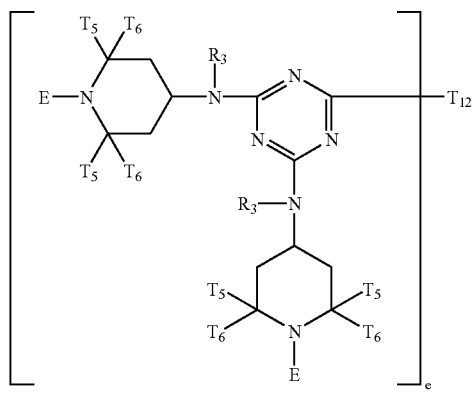
(K)

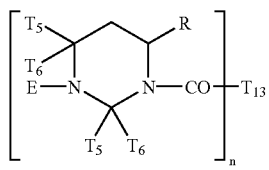
(L)

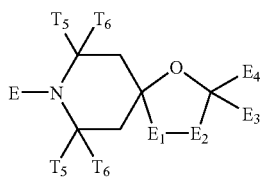
(M)

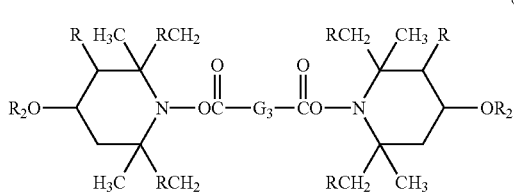
(N)

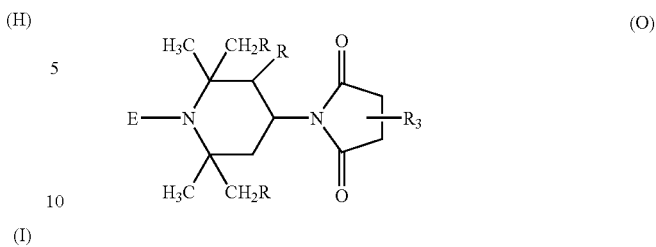
(O)

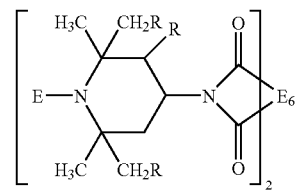
(P)

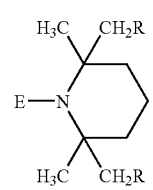
(Q)

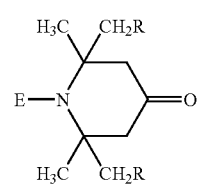
(R)

wherein

E is cyclohexyloxy,

R is hydrogen or methyl, m is 1 to 4, when m is 1, $R_2$ is hydrogen, $C_1$-$C_{18}$alkyl or said alkyl optionally interrupted by one or more oxygen atoms, $C_2$-$C_{12}$alkenyl, $C_6$-$C_{10}$aryl, $C_7$-$C_{18}$aralkyl, glycidyl, a monovalent acyl radical of an aliphatic, cyclo-aliphatic or aromatic carboxylic acid, or a carbamic acid, for example an acyl radical of an aliphatic carboxylic acid having 2-18 C atoms, of a cycloaliphatic carboxylic acid having 5-12 C atoms or of an aromatic carboxylic acid having 7-15 C atoms, or

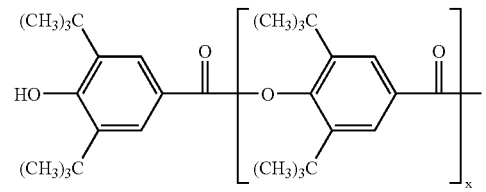

wherein x is 0 or 1,

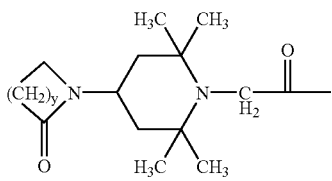

wherein y is 2-4;
when m is 2,
R$_2$ is C$_1$-C$_{12}$alkylene, C$_4$-C$_{12}$alkenylene, xylylene, a divalent acyl radical of an aliphatic, cycloaliphatic, araliphatic or aromatic dicarboxylic acid or of a dicarbamic acid, for example an acyl radical of an aliphatic dicarboxylic acid having 2-18 C atoms, of a cycloaliphatic or aromatic dicarboxylic acid having 8-14 C atoms, or of an aliphatic, cycloaliphatic or aromatic dicarbamic acid having 8-14 C atoms;

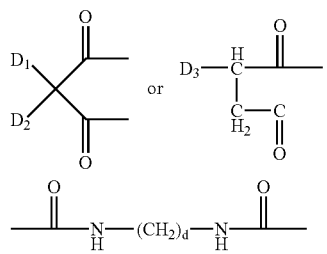

wherein D$_1$ and D$_2$ are independently hydrogen, an alkyl radical containing up to 8 carbon atoms, an aryl or aralkyl radical including 3,5-di-t-butyl-4-hydroxybenzyl radical, D$_3$ is hydrogen, or an alkyl or alkenyl radical containing up to 18 carbon atoms, and d is 0-20;
when m is 3, R$_2$ is a trivalent acyl radical of an aliphatic, unsaturated aliphatic, cycloaliphatic, or aromatic tricarboxylic acid;
when m is 4, R$_2$ is a tetravalent acyl radical of a saturated or unsaturated aliphatic or aromatic tetracarboxylic acid including 1,2,3,4-butanetetracarboxylic acid, 1,2,3,4-but-2-enetetracarboxylic, and 1,2,3,5- and 1,2,4,5-pentanetetracarboxylic acid;
p is 1, 2 or 3,
R$_3$ is hydrogen, C$_1$-C$_{12}$alkyl, C$_5$-C$_7$cycloalkyl, C$_7$-C$_9$aralkyl, C$_2$-C$_{18}$alkanoyl, C$_3$-C$_5$alkenoyl or benzoyl;
when p is 1,
R$_4$ is hydrogen, C$_1$-C$_{18}$alkyl, C$_5$-C$_7$cycloalkyl, C$_2$-C$_8$alkenyl, unsubstituted or substituted by a cyano, carbonyl or carbamide group, aryl, aralkyl, or it is glycidyl, a group of the formula —CH$_2$—CH(OH)-Z or of the formula —CO-Z or —CONH-Z wherein Z is hydrogen, methyl or phenyl; or a group of the formulae

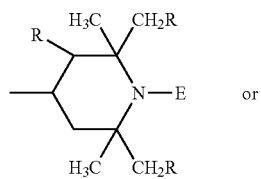

-continued

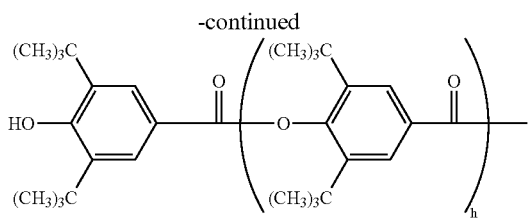

where h is 0 or 1,
R$_3$ and R$_4$ together, when p is 1, can be alkylene of 4 to 6 carbon atoms or 2-oxo-polyalkylene the cyclic acyl radical of an aliphatic or aromatic 1,2- or 1,3-dicarboxylic acid,
when p is 2,
R$_4$ is a direct bond or is C$_1$-C$_{12}$alkylene, C$_6$-C$_{12}$arylene, xylylene, a —CH$_2$CH(OH)—CH$_2$ group or a group —CH$_2$—CH(OH)—CH$_2$—O—X—O—CH$_2$—CH(OH)—CH$_2$— wherein X is C$_2$-C$_{10}$alkylene, C$_6$-C$_{15}$arylene or C$_6$-C$_{12}$cycloalkylene; or, provided that R$_3$ is not alkanoyl, alkenoyl or benzoyl, R$_4$ can also be a divalent acyl radical of an aliphatic, cycloaliphatic or aromatic dicarboxylic acid or dicarbamic acid, or can be the group —CO—; or
R$_4$ is R$_4$ is 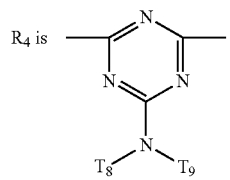

where T$_8$ and T$_9$ are independently hydrogen, alkyl of 1 to 18 carbon atoms, or T$_8$ and T$_9$ together are alkylene of 4 to 6 carbon atoms or 3-oxapentamethylene, for instance T$_8$ and T$_9$ together are 3-oxapentamethylene;
when p is 3,
R$_4$ is 2,4,6-triazinyl,
n is 1 or 2,
when n is 1,
R$_5$ and R'$_5$ are independently C$_1$-C$_{12}$alkyl, C$_2$-C$_{12}$alkenyl, C$_7$-C$_{12}$aralkyl, or R$_5$ is also hydrogen, or R$_5$ and R'$_5$ together are C$_2$-C$_8$alkylene or hydroxyalkylene or C$_4$-C$_{22}$acyloxyalkylene;
when n is 2,
R$_5$ and R'$_5$ together are (—CH$_2$)$_2$C(CH$_2$—)$_2$;
R$_6$ is hydrogen, C$_1$-C$_{12}$alkyl, allyl, benzyl, glycidyl or C$_2$-C$_6$alkoxyalkyl;
when n is 1,
R$_7$ is hydrogen, C$_1$-C$_{12}$alkyl, C$_3$-C$_5$alkenyl, C$_7$-C$_9$aralkyl, C$_5$-C$_7$cycloalkyl, C$_2$-C$_4$hydroxyalkyl, C$_2$-C$_6$alkoxyalkyl, C$_6$-C$_{10}$aryl, glycidyl, a group of the formula —(CH$_2$)$_t$—COO-Q or of the formula —(CH$_2$)$_t$—O—CO-Q wherein t is 1 or 2, and Q is C$_1$-C$_4$alkyl or phenyl; or
when n is 2,
R$_7$ is C$_2$-C$_{12}$alkylene, C$_6$-C$_{12}$arylene, a group —CH$_2$CH(OH)—CH$_2$—O—X—O—CH$_2$—CH(OH)—CH$_2$— wherein X is C$_2$-C$_{10}$alkylene, C$_6$-C$_{15}$arylene or C$_6$-C$_{12}$cycloalkylene, or a group —CH$_2$CH(OZ')

CH$_2$—(OCH$_2$—CH(OZ')CH$_2$)$_2$— wherein Z' is hydrogen, C$_1$-C$_{18}$alkyl, allyl, benzyl, C$_2$-C$_{12}$alkanoyl or benzoyl;

Q$_1$ is —N(R$_8$)— or —O—; E$_7$ is C$_1$-C$_3$alkylene, the group —CH$_2$—CH(R$_9$)—O— wherein R$_9$ is hydrogen, methyl or phenyl, the group —(CH$_2$)$_3$—NH— or a direct bond;

R$_{10}$ is hydrogen or C$_1$-C$_{18}$alkyl, R$_8$ is hydrogen, C$_1$-C$_{18}$alkyl, C$_5$-C$_7$cycloalkyl, C$_7$-C$_{12}$aralkyl, cyanoethyl, C$_6$-C$_{10}$aryl, the group —CH$_2$—CH(R$_9$)—OH wherein R$_9$ has the meaning defined above; a group of the formula

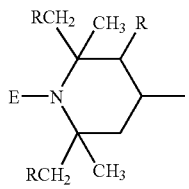

or a group of the formula

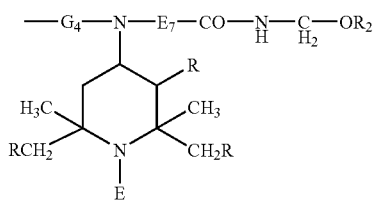

wherein G$_4$ is C$_2$-C$_6$alkylene or C$_6$-C$_{12}$arylene; or R$_8$ is a group -E$_7$—CO—NH—CH$_2$—OR$_{10}$;

Formula F denotes a recurring structural unit of a polymer where T$_3$ is ethylene or 1,2-propylene, is the repeating structural unit derived from an alpha-olefin copolymer with an alkyl acrylate or methacrylate; for example a copolymer of ethylene and ethyl acrylate, and where k is 2 to 100;

T$_4$ has the same meaning as R$_4$ when p is 1 or 2,

T$_5$ is methyl,

T$_6$ is methyl or ethyl, or T$_5$ and T$_6$ together are tetramethylene or pentamethylene, for instance T$_5$ and T$_6$ are each methyl, M and Y are independently methylene or carbonyl, and T$_4$ is ethylene where n is 2;

T$_7$ is the same as R$_7$, and T$_7$ is for example octamethylene where n is 2, T$_{10}$ and T$_{11}$ are independently alkylene of 2 to 12 carbon atoms, or T$_{11}$ is

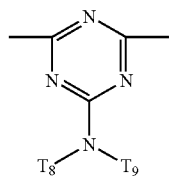

T$_{12}$ is piperazinyl,

—NR$_{11}$—(CH$_2$)$_d$—NR$_{11}$— or

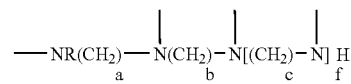

where R$_{11}$ is the same as R$_3$ or is also

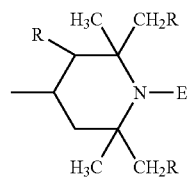

a, b and c are independently 2 or 3, and f is 0 or 1, for instance a and c are each 3, b is 2 and f is 1; and e is 2, 3 or 4, for example 4;

T$_{13}$ is the same as R$_2$ with the proviso that T$_{13}$ cannot be hydrogen when n is 1;

E$_1$ and E$_2$, being different, each are —CO— or —N(E$_5$)- where E$_5$ is hydrogen, C$_1$-C$_{12}$alkyl or C$_4$-C$_{22}$alkoxycarbonylalkyl, for instance E$_1$ is —CO— and E$_2$ is —N(E$_5$)-, E$_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, E$_4$ is hydrogen, alkyl of 1 to 30 carbon atoms, phenyl, naphthyl or phenylalkyl of 7 to 12 carbon atoms, or E$_3$ and E$_4$ together are polymethylene of 4 to 17 carbon atoms, or said polymethylene substituted by up to four alkyl groups of 1 to 4 carbon atoms, for example methyl, E$_6$ is an aliphatic or aromatic tetravalent radical, R$_2$ of formula (N) is a previously defined when m is 1;

G$_1$ a direct bond, C$_1$-C$_{12}$alkylene, phenylene or —NH-G'—NH wherein G' is C$_1$-C$_{12}$alkylene; or wherein the hindered amine compound is a compound of the formula I, II, III, IV, V, VI, VII, VIII, IX, X or XI

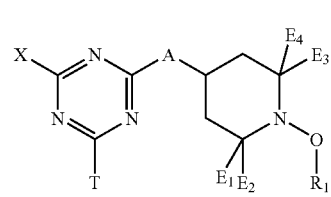
(I)

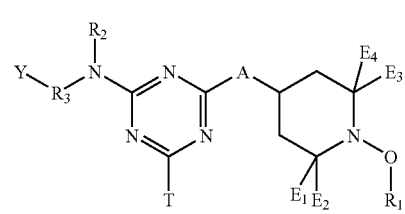
(II)

-continued
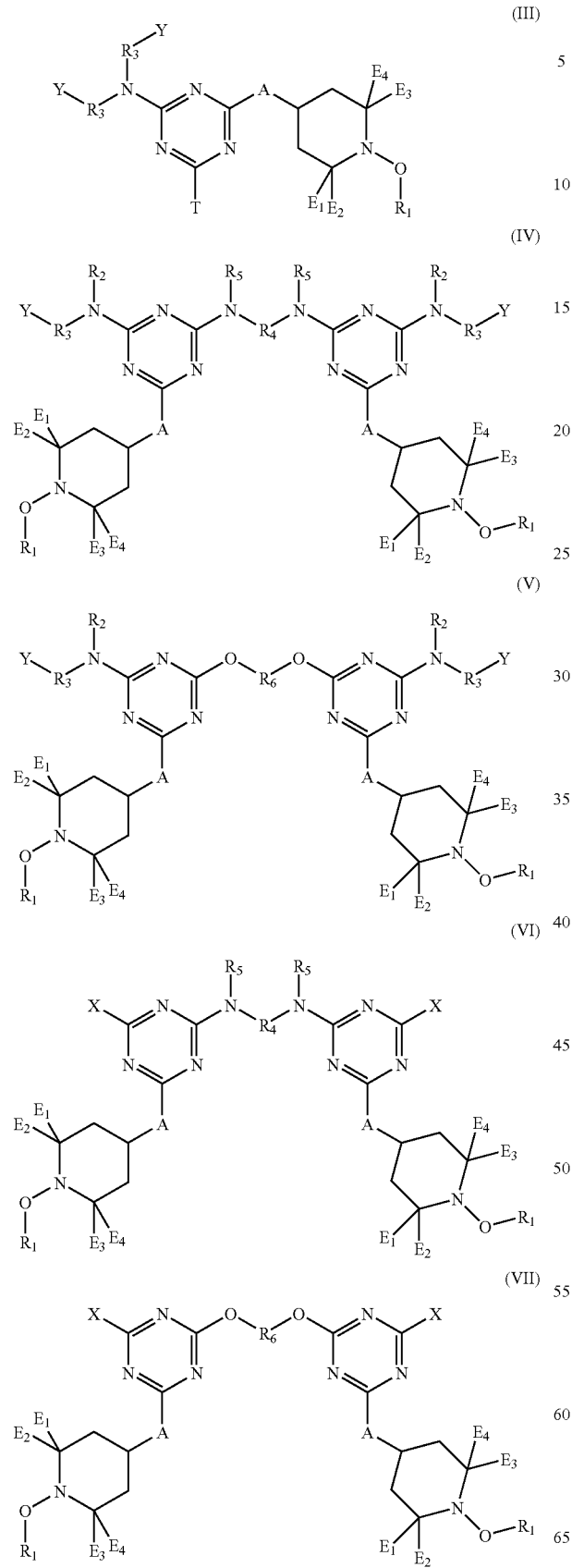
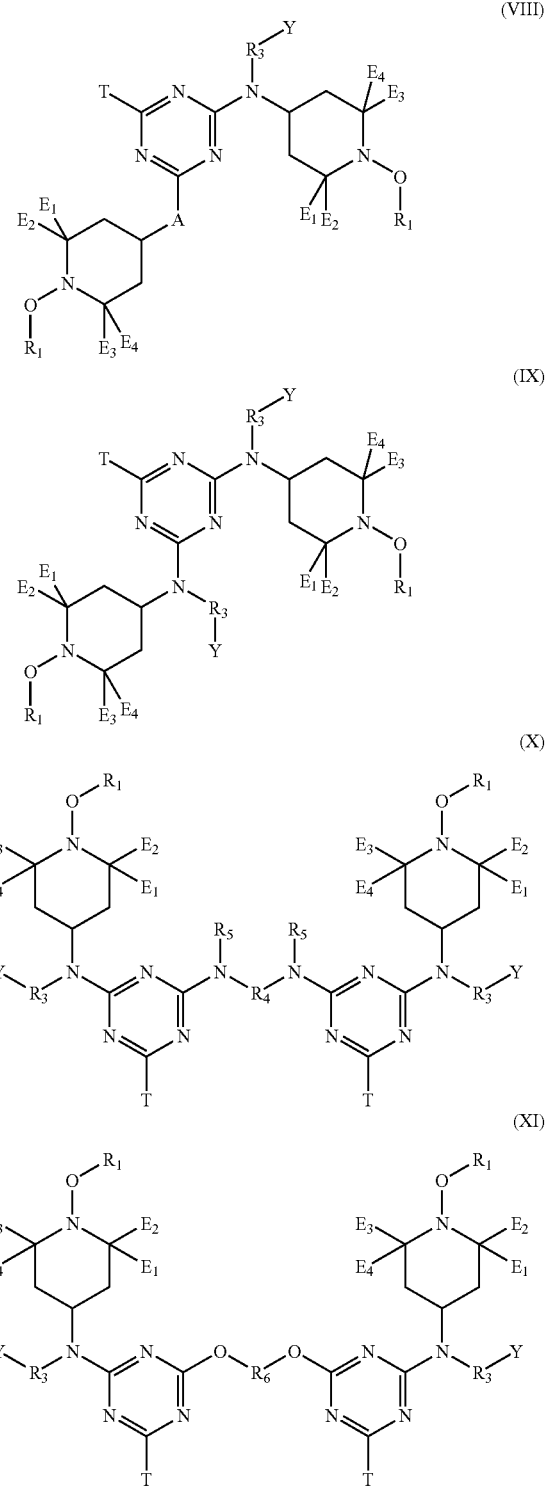
wherein
$E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene,
$R_1$ is cyclohexyl, $R_2$ is hydrogen or a linear or branched chain alkyl of 1 to 12 carbon atoms, $R_3$ is alkylene of 1 to 8 carbon atoms, or $R_3$ is —CO—, —CO—$R_4$—, —CONR$_2$—, or —CO—NR$_2$—$R_4$—, $R_4$ is alkylene of 1 to 8 carbon atoms, $R_5$ is hydrogen, a linear or branched chain alkyl of 1 to 12 carbon atoms, or

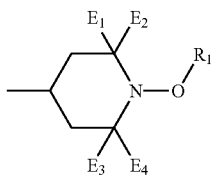

or when $R_4$ is ethylene, two $R_5$ methyl substituents can be linked by a direct bond so that the triazine bridging group —N($R_5$)—$R_4$—N($R_5$)— is a piperazin-1,4-diyl moiety, $R_6$ is alkylene of 2 to 8 carbon atoms or $R_6$ is

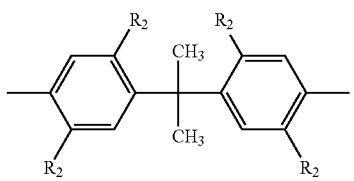

with the proviso that Y is not —OH when $R_6$ is the structure depicted above,

A is —O— or —NR$_7$— where $R_7$ is hydrogen, a straight or branched chain alkyl of 1 to 12 carbon atoms, or $R_7$ is

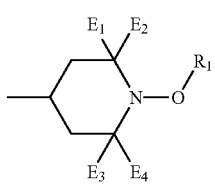

T is phenoxy, phenoxy substituted by one or two alkyl groups of 1 to 4 carbon atoms, alkoxy of 1 to 8 carbon atoms or —N($R_2$)$_2$ with the stipulation that $R_2$ is not hydrogen, or T is

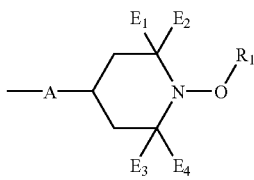

X is —NH$_2$, —NCO, —OH, —O-glycidyl, or —NHNH$_2$, and

Y is —OH, —NH$_2$, —NHR$_2$ where $R_2$ is not hydrogen; or Y is —NCO, —COOH, oxiranyl, —O-glycidyl, or —Si(OR$_2$)$_3$; or the combination $R_3$—Y— is —CH$_2$CH(OH)R$_2$ where $R_2$ is alkyl or said alkyl interrupted by one to four oxygen atoms, or $R_3$—Y— is —CH$_2$OR$_2$; or wherein the hindered amine compound is a mixture of N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine; N,N',N''-tris{2,4-bis[(1-hydrocarbyloxy-2,2,6,6-tetramethylpiperidin-4-yl)alkylamino]-s-triazin-6-yl}-3,3'-ethylenediimino -dipropylamine, and bridged derivatives as described by formulas I, II, IIA and III

where in the tetraamine of formula I
$R_1$ and $R_2$ are the s-triazine moiety E; and one of $R_3$ and $R_4$ is the s-triazine moiety E with the other of $R_3$ or $R_4$ being hydrogen, E is

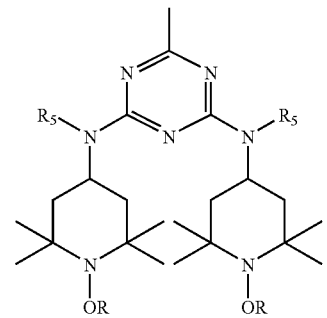

R is cyclohexyl, $R_5$ is alkyl of 1 to 12 carbon atoms, for example n-butyl, where in the compound of formula II or IIA when R is cyclohexyl, T and $T_1$ are each a tetraamine substituted by $R_1$-$R_4$ as is defined for formula I, where
(1) one of the s-triazine moieties E in each tetraamine is replaced by the group $E_1$ which forms a bridge between two tetraamines T and $T_1$, $E_1$ is

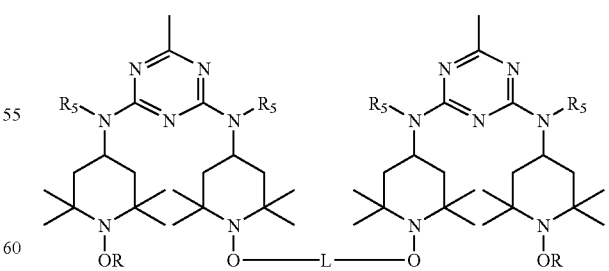

or (2) the group $E_1$ can have both termini in the same tetraamine T as in formula IIA where two of the E moieties of the tetraamine are replaced by one $E_1$ group, or (3) all three s-triazine substituents of tetraamine T can be $E_1$ such that one $E_1$ links T and $T_1$ and a second $E_1$ has both termini in tetraamine T, L is cyclohexanediyl;

where in the compound of formula III

G, $G_1$ and $G_2$ are each tetraamines substituted by $R_1$-$R_4$ as defined for formula I, except that G and $G_2$ each have one of the s-triazine moieties E replaced by $E_1$, and $G_1$ has two of the triazine moieties E replaced by $E_1$, so that there is a bridge between G and $G_1$ and a second bridge between $G_1$ and $G_2$;

which mixture is prepared by reacting two to four equivalents of 2,4-bis[(1-hydrocarbyloxy-2,2,6,6-piperidin-4-yl)butylamino]-6-chloro-s-triazine with one equivalent of N,N'-bis(3-aminopropyl)-ethylenediamine.

8. A composition according to claim 1 wherein the stabilizer of component (i) is the reaction product of 2,4-bis[(1-cyclohexyloxy-2,2,6,6-piperidin-4-yl)butylamino]-6-chloro-s-triazine with N,N'-bis(3-aminopropyl)ethylenediamine).

9. A composition according to claim 1 in which the stabilizer of component (i) is from about 0.1 to about 10% by weight based on the weight of the polyolefin substrate (A).

10. A composition according to claim 1 in which the phosphazene of component (ii) is about 0.01 to about 2% by weight based on the weight of the polyolefin substrate (A).

11. A composition according to claim 2 in which component (iii) is from about 0.5 to about 40% by weight based on the weight of the polyolefin substrate (A).

12. A composition according to claim 1 comprising a further component selected from the group consisting of pigments, dyes, plasticizers, phenolic antioxidants, thixotropic agents, levelling assistants, basic costabilizers, nitrone stabilizers, amine oxide stabilizers, benzofuranone stabilizers, UV absorbers, sterically hindered amines, metal passivators, metal oxides, organophosphorus compounds, hydroxylamines, non-halogenated flame retardants, and mixtures thereof.

13. A composition according to claim 12 in which the further component is selected from the group consisting of phenolic antioxidants, calcium stearate, zinc stearate, phosphite or phosphonite stabilizers, benzofuranone stabilizers, UV absorbers of the 2-(2'-hydroxyphenyl)benzotriazole or 2-(2-hydroxyphenyl)-1,3,5-triazine classes, and sterically hindered amines.

14. A process for imparting light stability and flame retardancy to a polyolefin substrate, which process comprises adding to said substrate (i) at least one compound selected from the group consisting of the sterically hindered alkoxyamine stabilizers and (ii) at least one phosphazene flame retardant, where the sterically hindered alkoxyamine stabilizers are of the formula

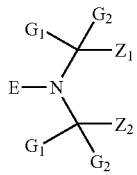

where $G_1$ and $G_2$ are independently alkyl of 1 to 8 carbon atoms or are together pentamethylene, $Z_1$ and $Z_2$ are each methyl, or $Z_1$ and $Z_2$ together form a linking moiety which may additionally be substituted by an ester, ether, amide, amino, carboxy or urethane group, and E is cyclohexyloxy, and where the phosphazene is of the formula

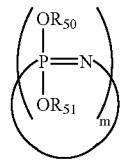

where m is 3 or 4 and $R_{50}$ and $R_{51}$ are independently selected from methyl, phenyl and p-tolyl.

15. A process according to claim 14, which process comprises further adding (iii) tris[3-bromo-2,2-bis(bromomethyl)propyl]phosphate.

16. A flame retardant additive combination comprising (i) at least one compound selected from the group consisting of the (c) sterically hindered alkoxyamine stabilizers and (ii) at least one phosphazene flame retardant and optionally (iii) tris[3-bromo-2,2-bis(bromomethyl)propyl]phosphate where the sterically hindered alkoxyamine stabilizers are of the formula

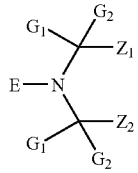

where $G_1$ and $G_2$ are independently alkyl of 1 to 8 carbon atoms or are together pentamethylene, $Z_1$ and $Z_2$ are each methyl, or $Z_1$ and $Z_2$ together form a linking moiety which may additionally be substituted by an ester, ether, amide, amino, carboxy or urethane group, and E is cyclohexyloxy, and where the phosphazene is of the formula

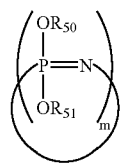

where m is 3 or 4 and $R_{50}$ and $R_{51}$ are independently selected from methyl, phenyl and p-tolyl.

17. A molded polyolefin article comprising (A) a polyolefin substrate and (B) (i) at least one compound selected from the group consisting of the (c) sterically hindered alkoxyamine stabilizers and
(ii) at least one phosphazene flame retardant and optionally
(iii) tris[3-bromo-2,2-bis(bromomethyl)propyl]phosphate
where the sterically hindered alkoxyamine stabilizers are of the formula

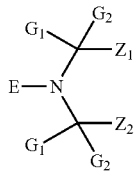

where
G$_1$ and G$_2$ are independently alkyl of 1 to 8 carbon atoms or are together pentamethylene, Z$_1$ and Z$_2$ are each methyl, or Z$_1$ and Z$_2$ together form a linking moiety which may additionally be substituted by an ester, ether, amide, amino, carboxy or urethane group, and E is cyclohexyloxy, and
where the phosphazene is of the formula

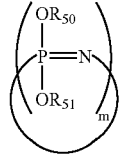

where m is 3 or 4 and R$_{50}$ and R$_{51}$ are independently selected from methyl, phenyl and p-tolyl.

* * * * *